(12) United States Patent
Iwamura

(10) Patent No.: US 7,816,899 B2
(45) Date of Patent: Oct. 19, 2010

(54) POWER CONVERSION DEVICE

(75) Inventor: Takahiro Iwamura, Nishio (JP)

(73) Assignee: DENSO CORPORATION, Kariya (JP)

( * ) Notice: Subject to any disclaimer, the term of this patent is extended or adjusted under 35 U.S.C. 154(b) by 333 days.

(21) Appl. No.: 12/081,320

(22) Filed: Apr. 15, 2008

(65) Prior Publication Data

US 2008/0252271 A1 Oct. 16, 2008

(30) Foreign Application Priority Data

Apr. 16, 2007 (JP) ............................. 2007-107160

(51) Int. Cl.
*G05F 1/40* (2006.01)
(52) U.S. Cl. ..................................... 323/282
(58) Field of Classification Search .............. 323/265, 323/271, 273–275, 282–285, 351
See application file for complete search history.

(56) References Cited

U.S. PATENT DOCUMENTS 7,110,269 B2 * 9/2006 Cao et al. ................ 363/21.03
7,518,328 B2 * 4/2009 Balsiger ................. 318/400.22
7,729,134 B2 * 6/2010 Kimura ....................... 363/20
2009/0115389 A1 * 5/2009 Chu et al. .................... 323/282

FOREIGN PATENT DOCUMENTS

| JP | A-10-146088 | 5/1998 |
| JP | A-2004-120844 | 4/2004 |
| JP | A-2004-248374 | 9/2004 |
| JP | A-2006-087194 | 3/2006 |
| WO | WO 2006/104268 | 10/2006 |

* cited by examiner

*Primary Examiner*—Adolf Berhane
(74) *Attorney, Agent, or Firm*—Posz Law Group, PLC

(57) ABSTRACT

In a power conversion device having high side and low side switches connected to a coil, a direction of a coil current is determined during a dead time period where the respective switches turn off at the same time to make the increase/decrease ratio of the coil current correspond to a command value. Based on a direction detection signal and a PWM signal of a PWM signal generation unit, an operation mode of a power converter circuit is determined, and a ratio correction value and an offset value of the PWM signal is set with respect to a control period of the PWM signal. As a result, a change in the operation mode of the power converter circuit is detected to allow the increase/decrease ratio of the coil current to correspond to a command switching ratio.

22 Claims, 23 Drawing Sheets

| FIRST MODE | PWM WIDTH (H) = Sd WIDTH−2Td |
| --- | --- |
| SECOND MODE | PWM WIDTH (H) = Sd WIDTH−Td |
| THIRD MODE | PWM WIDTH (H) = Sd WIDTH |

POWER CONVERSION DEVICE

CROSS REFERENCE TO RELATED APPLICATION

This application is based on and incorporates herein by reference Japanese Patent Application No. 2007-107160 filed on Apr. 16, 2007.

FIELD OF THE INVENTION

The present invention relates to a power conversion device having a chopper circuit with a high side switch and a low side switch.

BACKGROUND OF THE INVENTION

A conventional power converter circuit 10 has, as shown in FIG. 21, a coil L having one end connected to a DC power source 2, a high side switch SW1 and a low side switch SW2, which are connected to another terminal of the coil L, and a capacitor C that is connected to ends of the respective switches SW1 and SW2 at an opposite side of the coil L.

In the power converter circuit 10 of the above type, the high side switch SW1 and the low side switch SW2 which constitute a chopper circuit alternately turn on and off to change over a path of a current that flows in the coil L, thereby controlling an output voltage Vout produced from the capacitor C.

In the power converter circuit 10 of the above type, when the high side switch SW1 and the low side switch SW2 turn on at the same time in conducting output control, a through-current may flow in the chopper circuit due to an electric power that is stored in the capacitor C, resulting in a damage of the respective switches SW1 and SW2.

For this reason, in the power conversion device having the power converter circuit 10 of the above type, a dead time for turning off the respective switches SW1 and SW2 at the same time is given a drive signal of the respective switches SW1 and SW2 so that the switch SW2 (or SW1) which is in an off state turns on after the switch SW1 (or SW2) which is an on state turns off when the on/off states of the respective switches SW1 and SW2 changes over.

That is, the power conversion device shown in FIG. 21 represents a DC/DC converter that S up an input voltage Vin from the DC power source 2 through the power converter circuit 10 to generate a drive voltage of an electric load 4. The power conversion device includes an A/D converter 12 that converts the output voltage Vout that is a drive voltage of the load 4 into a digital value, a deviation calculation unit 14 that calculates a deviation between the output voltage Vout that has been converted into a digital value by the A/D converter 12 and a command value (that is, a target voltage) representative of a target value of the output voltage Vout, a switching ratio calculation unit 16 that calculates the switching ratio of the power converter circuit 10 necessary to make the deviation zero based on the deviation that has been calculated by the deviation calculation unit 14 and a control gain (a control gain such as proportion/integration/differential), and a PWM signal generation unit 19 that generates a PWM signal for turning on and off the high side switch SW1 and the low side switch SW2 based on the switching ratio that has been calculated by the switch ratio calculation unit 16, respectively.

Then, the PWM signal generation unit 19 sets both of the PWM signals to the respective switches SW1 and SW2 to low level for a predetermined dead time Td. This prevents the respective switches from turning on by a response delay at the time of turning off the respective switches SW1 and SW2, simultaneously, when the PWM signal generation unit 19 generates the PWM signals for driving the respective switches SW1 and SW2, respectively (FIG. 22).

For this reason, according to the power conversion device shown in FIG. 21, the through-current can be prevented from flowing in the chopper circuit by turning on the respective switches SW1 and SW2, simultaneously, at the time of changing over the on/off states of the high side switch SW1 and the low side switch SW2.

a current flows in the coil L through parasitic diodes of transistors (MOSFETs in the figure) which constitute the respective switches SW1 and SW2 for the dead time Td during which both of the PWM signals to the respective switches SW1 and SW2 are low in signal level. The current direction is different according to the fluctuation region of the coil current under the control.

That is, as exemplified in FIG. 22, an increase/decrease direction of the coil current Ic that flows during the dead time period Td (shaded region in FIG. 22) after the high side switch turns off is different between when the coil current Ic is a positive current value within the control cycle period (Imin≧0) and when the coil current Ic varies from positive to negative or from negative to positive (Imin<0<Imax).

In FIG. 22, Imin represents the minimum value of the coil current, and Imax represents the maximum value of the coil current. When the coil current Ic is positive which is larger than 0 A, the current flows in the coil L from the DC power source 2 side to the connection point side of the switches SW1 and SW2. When the coil current Ic is negative which is smaller than 0 A, the current flows in the coil L to the DC power source 2 side from the connection point side of the switches SW1 and SW2.

When the ratio of the dead time period Td to one cycle of the PWM signal (that is, control cycle period Tcp) is small even if the increase/decrease direction of the coil current Ic during the dead time period Td is different as described above, there arises substantially no problem. However, when the ratio of the dead time period to the control cycle period is larger with the higher switching frequency, the following problem occurs. That is, as shown in FIG. 23, the increase/decrease direction of the coil current Ic that flows during the dead time Td changes to deviate the coil current Ic from an ideal current Ii. As a result, the output voltage is temporarily largely deviated from the target voltage.

That is, FIG. 23 shows a change in the coil current Ic when the load 4 varies from −200 W to +200 W in the case where the PWM signal generation unit 19 subtracts the dead time Td from an on-time TH of the high side switch SW1 and an on-time TL of the low side switch SW2, respectively, to generate the PWM signals PWM(L) and PWM(H) for driving the high side switch SW1 and the low side switch SW2, respectively. The on-time TL of the low side switch SW2 and the on-time TH of the high side switch SW1 correspond to the switch ratio (ratio command value) Rsw that has been calculated by the switching ratio calculation unit 16.

As is apparent from FIG. 23, the coil current Ic changes in correspondence with the PWM signal that is generated by the PWM signal generation unit 19 when the coil current Ic changes around 0 A within the control cycle period (Imin<0<Imax). When the coil current Ic is equal to or lower than 0 A over the entire region of the control cycle period (Imax≦0), or when the coil current Ic is equal to or higher than 0 A over the entire region of the control cycle period (Imin≧0), the ratio of the increase/decrease in the coil current Ic does not correspond to the ratio command value, the coil current Ic cannot change along the ideal current Ii, and the output voltage Vout is deviated from the target voltage.

On the other hand, in order to prevent the above problem, for example, JP 2004-120844A) proposes that, as indicated by dotted lines in FIG. 21, the output voltage Vout and the output current to the load 4 from the power converter circuit 10 is detected to obtain the output power that is actually supplied to the load 4 from the power converter circuit 10. In this proposal, the output power is then compared with plural threshold values (comparison unit 82) to determine a path of the coil current within the power converter circuit (a variation region: Imax≦0, Imin<0<Imax, Imin≧0). The correction value of the switching ratio (ratio command value) is obtained based on the determination result (correction value calculation unit 84), and the switching ratio (ratio command value) is corrected by using the correction value (correction unit 18).

However, the above proposed device estimates the variation region (Imax≦0, Imin<0<Imax, Imin≧0) of the coil current within the power converter circuit 10 based on the output power from the power converter circuit 10 to the load 4 to correct the switching ratio. Therefore, the proposed device is incapable of precisely determining the variation region (Imax≦0, Imin<0<Imax, Imin≧0) of the coil current within the power converter circuit 10 based on the output power during a transition period, where the power consumption on the load side rapidly changes from positive to negative, or vice versa. As a result, as shown in FIG. 24, the coil current Ic changes earlier than the ideal current Ii.

That is, the coil current Ic changes as shown in FIG. 24, when the load power changes from −200 W to +200 W in a short time in the case where the comparison unit 82, the correction value calculation unit 84, and the correction unit 18 in FIG. 21 are configured as follows.

(1) the on-times of the respective switches SW1 and SW2 are set to reference times "TL−Td" and "TH−Td" obtained by subtracting the dead time Td from the on-times TL and TH corresponding to the switching ratio (ratio command value) when the power consumption (output power) of the load 4 is in a range of from −150 W to +150 W, (2) the on-time of the switch SW1 is set to be shorter than the reference time "TL−Td" by the dead time Td (TL−2Td), and the on-time of the switch SW2 is set to be longer than the reference time "TH−Td" by the dead time Td (TH) when the output voltage is lower than −150 W, and (3) the on-time of the switch SW1 is set to be longer than the reference time "TL−Td" by the dead time Td (TL), and the on-time of the switch SW2 is set to be shorter than the reference time "TH−Td" by the dead time Td (TH−2Td) when the output voltage is larger than +150 W.

An increase/decrease direction of the coil current that flows in the coil L during the dead time period Td is changed after electric charges have been stored in the capacitor C are gradually discharged, and the output voltage Vout becomes lower than the command value with an increase in the power consumption of the load 4 (a current that flows in the load).

For this reason, when the fluctuation region (Imax≦0, Imin<0<Imax, Imin≧0) of the coil current is estimated from the power consumption (output power) of the load 4 to change the dead time Td that is given to the PWM signals of the respective switches SW1 and SW2, as shown in FIG. 24, the increase/decrease ratio (TL/(TL+TH)) of the coil current cannot correspond to the switching ratio (ratio command value).

SUMMARY OF THE INVENTION

The present invention has therefore an object to provide a power conversion device, which optimally controls the increase/decrease ratio of a coil current even during a transition period where the power consumption of a load largely changes from positive to negative, or vice versa.

In order to achieve the above object, a power conversion device includes a coil, and a power converter circuit having a high side switch and a low side switch, which change over a path of a current that flows in the coil.

In this power conversion device, a switching ratio of the power converter circuit is set so that an output from the power converter circuit becomes a target value, and PWM signals are generated to alternately turn on and off the high side switch and the low side switch based on the set switching ratio, respectively. A dead time is given to the PWM signals of the respective switches in order to prevent both of the switches from turning on when the on/off states of the respective switches change over to allow a through-current to flow.

Further, a coil current that flows in the coil is detected, and a direction of the coil current during the dead time period where the high side switch and the low side switch are off is determined based on a detection signal from the coil current detecting means. The PWM signals of the respective switches are corrected according to the determination result of the current direction to change the coil current according to the switching ratio. This is different from the above background art, in which the output power from the power converter circuit to the load is detected and the current that flows in the coil during the dead time period is estimated.

Therefore, the direction of the current that flows in the coil during the dead time period is precisely determined so as to correct the PWM signals of the respective switches even during the transition when the power consumption of the load changes from positive to negative or from negative to positive. This makes it possible that the increase/decrease ratio of the coil current is made to correspond to the switching ratio so as to control the output from the power converter circuit to the target value.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
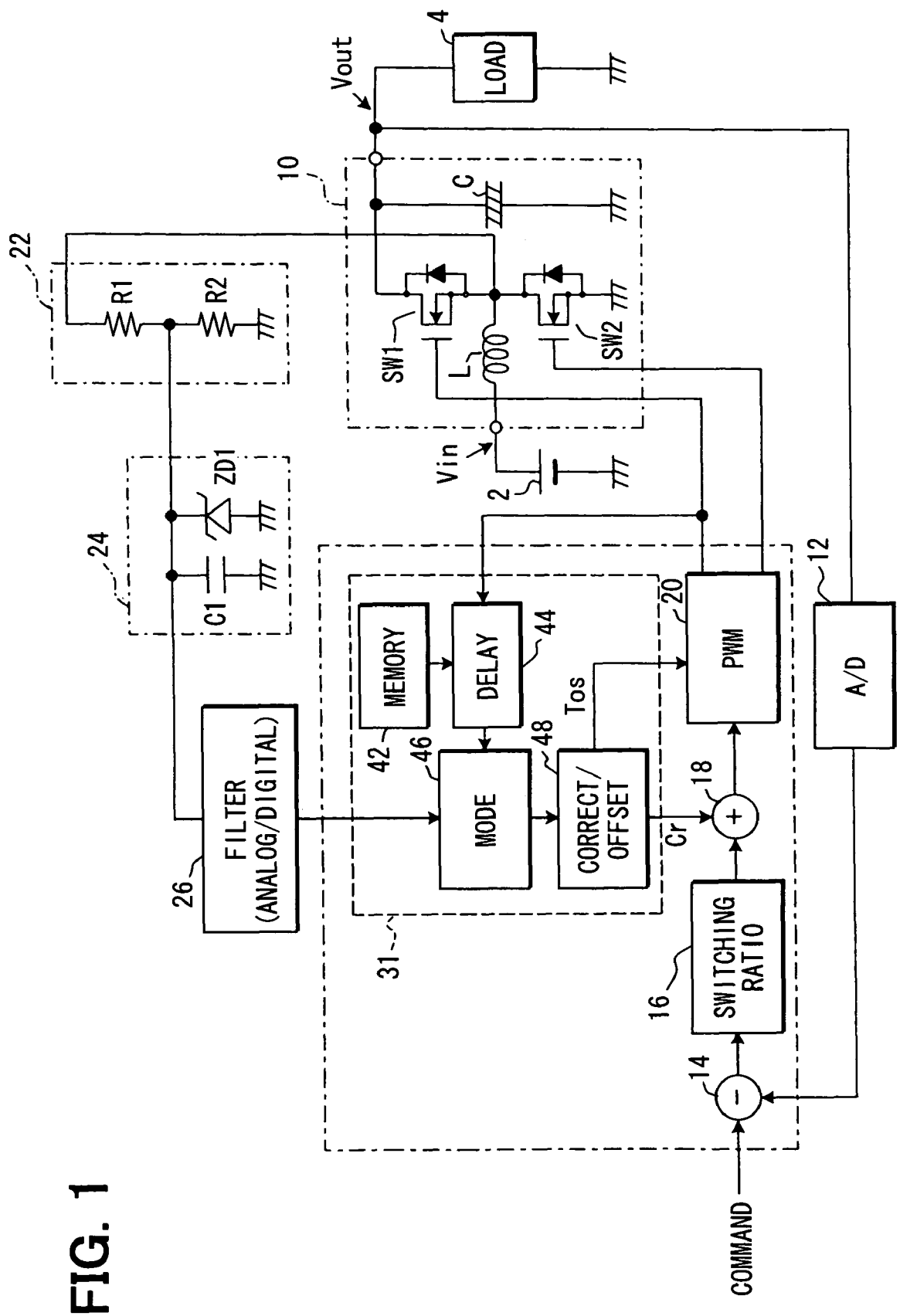
FIG. 1 is a block diagram showing a power conversion device according to a first embodiment of the present invention.

Referring first to FIG. 1, a power conversion device is a step-up type DC/DC converter that S up an input voltage Vin that is applied from a DC power source 2 to generate a constant voltage (output voltage Vout) corresponding to a command value and apply the constant voltage to an electric load 4.

For this reason, as shown in FIG. 1, the power conversion device includes a power converter circuit 10 including a coil L, a high side switch SW1, a low side switch SW2, and a capacitor C. The power conversion device further includes an A/D converter 12 that subjects an output voltage Vout to A/D conversion, a deviation calculation unit 14 that calculates a deviation between an output from the A/D converter 12 (an A/D conversion value of the output voltage Vout) and a command value, a switching ratio calculation unit 16 that calculates the switching ratio of the power converter circuit 10 required to make the deviation calculated by the deviation calculation unit 14 zero, and a PWM signal generation unit 20 that generates the PWM signals of the respective switches SW1 and SW2 within the power converter circuit 10 based on the switching ratio that is calculated by the switching ratio calculation unit 16, as in the conventional device shown in FIG. 21.

Figure 21:
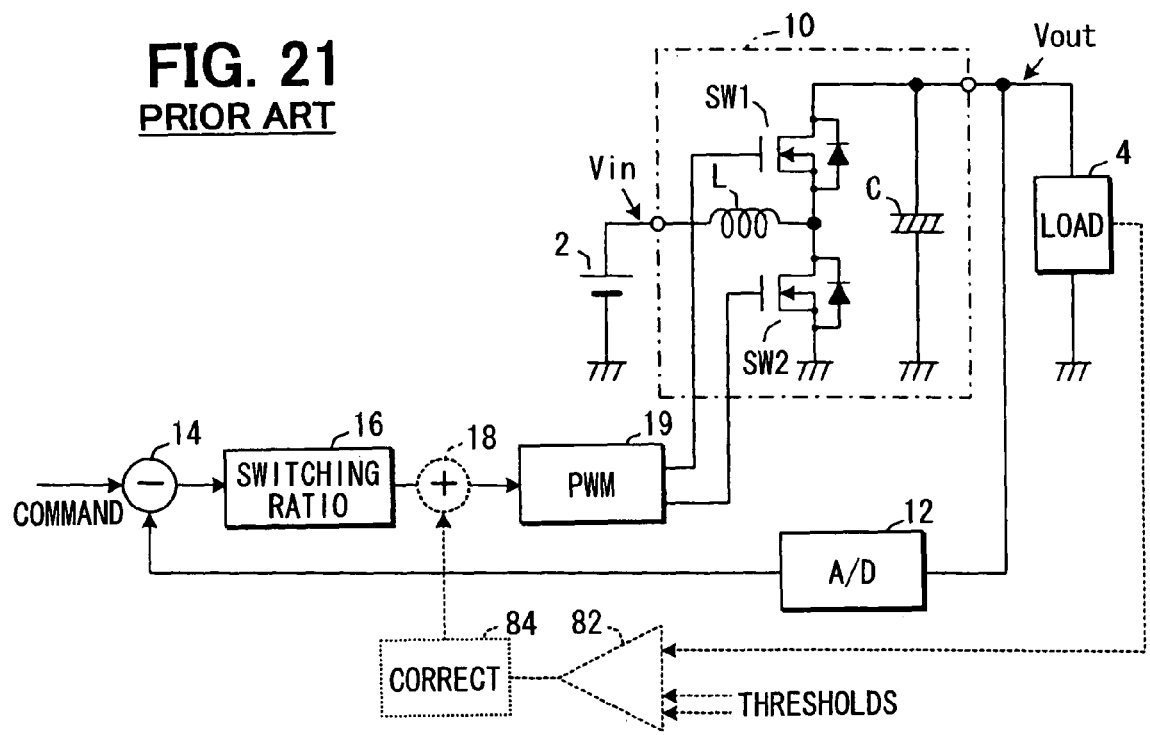
FIG. 21 is a block diagram showing the structure of a conventional power conversion device.

The PWM signal generation unit 20 generates the PWM signal that is given a dead time Td in synchronism with a predetermined control cycle period as in the conventional PWM signal generation unit 19 shown in FIG. 21. However, the PWM signal generation unit 20 is capable of adjusting an offset time (offset value Tos) until the PWM signal (PWM signal of the low side switch SW2 in this embodiment) rises from a start timing of the control cycle period at the time of generating the PWM signal.

The deviation calculation unit 14, the switching ratio calculation unit 16, and the PWM signal generation unit 20 operate in synchronism with clocks, and are constituted by a digital circuit that is capable of programming the operation, that is, FPGA (field programmable gate array).

The FPGA is equipped with a correction unit 18 for correcting the switching ratio used to generate the PWM signals for the respective switches SW1 and SW2 in the PWM signal generation unit 20, respectively, and a correction value calculation unit 31 that calculates a ratio correction value for correcting the switching ratio through the correction unit 18, and an offset value Tos used to generate the PWM signal in the PWM signal generation unit 20, in addition to the above respective units.

The correction value calculation unit 31 includes a delay unit 44 that delays the PWM signal of the high side switch SW1 among the PWM signals that are generated by the PWM signal generation unit 20 by a delay time that is stored in a delay time memory unit 42, and takes in the delayed PWM signal, an operation mode determination unit 46 that determines the operation mode of the power converter circuit 10 based on the PWM signal that has been input through the delay unit 44 and a detection signal Sd that is input from the external, and a ratio correction/offset value setting unit 48 that sets the ratio correction value and the offset value Tos based on the determination results of the operation mode in the operation mode determination unit 46.

In this example, the detection signal Sd that is input to the operation mode determination unit 46 is a voltage signal Vmp representative of a coil current (in more detail, the direction of the coil current) which flows in the coil L of the power converter circuit 10. The detection signal is generated by a detector circuit 22 that divides a potential of a measurement point by two resistors R1 and R2. The measurement point is a connection point of the high side switch SW1 and the low side switch SW2 in the power converter circuit 10 (end of the coil L at an opposite side of the DC power source 2).

The detection signal Vmp that has been generated by the detector circuit 22 is input to the operation mode determination unit 46 through a surge absorption protection circuit 24 that includes a Zener diode ZD1 and a capacitor C1, and a noise filter circuit (noise filter) 26. The noise filter 26 can be formed of an analog filter or a digital filter.

Subsequently, the operation mode determination unit 46 determines whether the power converter circuit 10 is now in any mode of a first mode, a second mode, and a third mode shown in FIG. 2. That is, as described above, the operation modes of the power converter circuit 10 include three operation modes including a first mode in which all of the coil current flows in a positive direction from the DC power source 2 side to the measurement point side (Imin≧0) within one control cycle period Tcp, a second mode in which the coil current changes from the positive direction to the negative direction, or from the negative direction to the positive direction (Imin<0<Imax) within one control cycle period Tcp, and a third mode in which all of the coil current flows in a negative direction from the measurement point side to the DC power source 2 side (Imax≧0) within one control cycle period Tcp. The increase/decrease direction of the coil current that flows during the dead time period after the high side switch SW1 and the low side switch SW2 have turned off is different in each of the operation modes.

Figure 3:
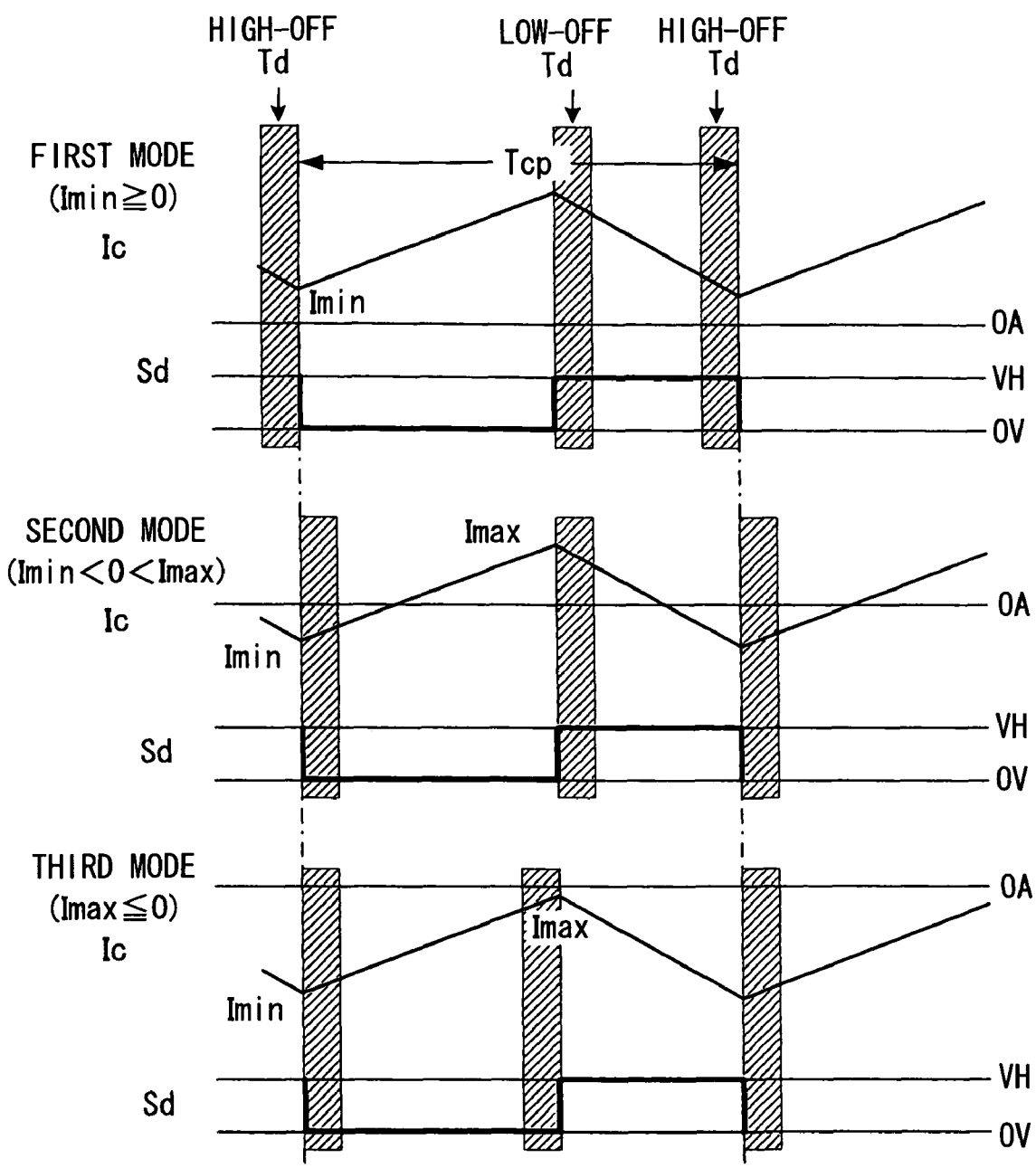
FIG. 3 is an operation diagram showing a detection signal that is output from a detector circuit according to the first embodiment.

As shown in FIG. 3, the detection signal (that is, a voltage at the measurement point) which is generated by a resistor voltage division in the detector circuit 22 becomes a ground potential (0V: low level) when the coil current flows in the increase direction even if the operation mode of the power converter circuit 10 is any one of the first to third modes, and becomes a high level (VH) corresponding to the output voltage Vout when the coil current flows in the decrease direction.

Under the above circumstances, the operation mode determination unit 46 determines which of the first, second, and third modes the operation mode of the power converter circuit 10 is based on the detection signal from the detector circuit 22 which is input through the protection circuit 24 and the noise filter 26 and the PWM signal (PWM signal of the high side switch SW1 in this embodiment) that is input through the delay unit 44.

Figure 2:
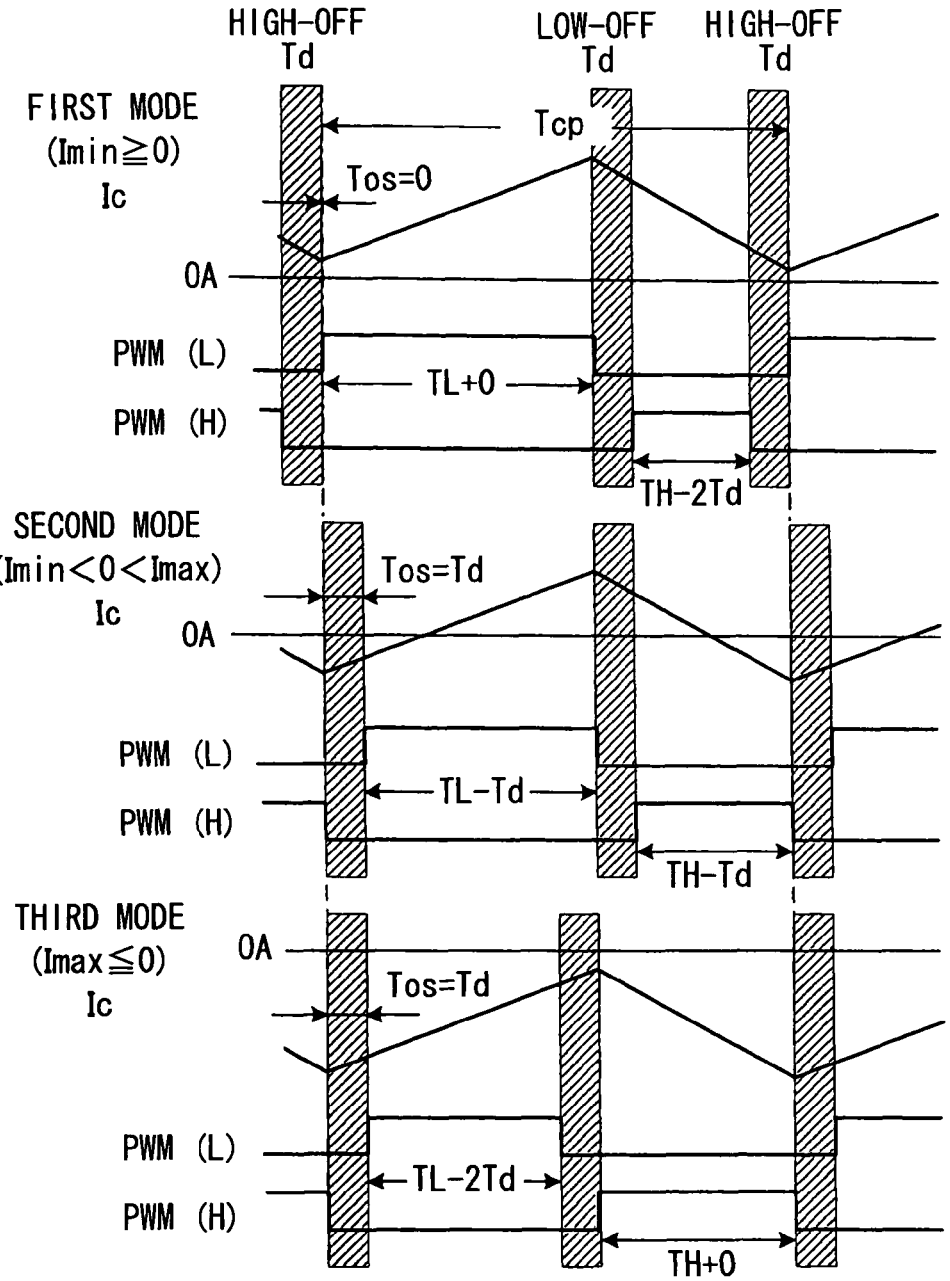
FIG. 2 is a signal explanatory diagram showing the operation of correcting a ratio and offset by a correction value calculation unit according to the first embodiment.

Then, the ratio correction/offset value setting unit 48 sets correction values (0, −Td, −2Td) for the pulse widths TH and TL of the PWM signals of the respective switches SW1 and SW2 according to a table indicated at the bottom of FIG. 2 according to the operation mode determined by the operation mode determination unit 46. The ratio correction/offset value setting unit 48 sets an offset value Tos (0, Td) for the control cycle period when the PWM signal is actually generated by the PWM signal generation unit 20.

That is, in the first mode (Imin≧0), the ratio correction/offset value setting unit 48 sets the ratio correction value for the PWM signal to "0" so that the pulse width of the PWM signal PWM(L) for the low side switch SW2 becomes the pulse width TL corresponding to the switching ratio. The ratio correction/offset value setting unit 48 sets the ratio correction value for the PWM signal to "−2Td" so that the pulse width of the PWM signal PWM(H) for the high side switch SW1 becomes the pulse width (TH−2Td) obtained by subtracting the dead time Td after the respective switches have turned off from the pulse width TH corresponding to the switching ratio. Further, the ratio correction/offset value setting unit 48 sets the offset value Tos to "0" so that the PWM signal for the low side switch SW2 rises at the start timing of the control cycle period.

In the second mode (Imin<0<Imax), the ratio correction/offset value setting unit 48 sets the ratio correction values for the respective PWM signals to "−Td" so that the pulse widths of the PWM signals for the respective switches SW1 and SW2 become the pulse widths (TH−Td, TL−Td) obtained by subtracting the dead time Td from the pulse widths TH and TL corresponding to the switching ratio. The ratio correction/offset value setting unit 48 sets the offset value Tos to "Td" so that the PWM signal for the low side switch SW2 rises at a time point where the dead time Td has elapsed from the start timing of the control cycle period.

Further, in the third mode (Imax≦0), the ratio correction/offset value setting unit 48 sets the ratio correction values for the PWM signal to "0" so that the pulse width of the PWM signal for the high side switch SW1 becomes the pulse width TH corresponding to the switching ratio. The ratio correction/offset value setting unit 48 sets the ratio correction value for the PWM signal to "−2Td" so that the pulse width of the PWM signal for the low side switch SW2 becomes a pulse width (TL−2Td) obtained by subtracting the dead time Td after the respective switches have turned off from the pulse width TL corresponding to the switching ratio. Further, the ratio correction/offset value setting unit 48 sets the offset value Tos to "Td" so that the PWM signal for the low side switch SW2 rises at a time point where the dead time Td has elapsed from the start timing of the control cycle period.

On the other hand, the delay unit 44 makes the time axes of the PWM signal that is input to the operation mode determination unit 46 and the detection signal coincide with each other.

Figure 4:
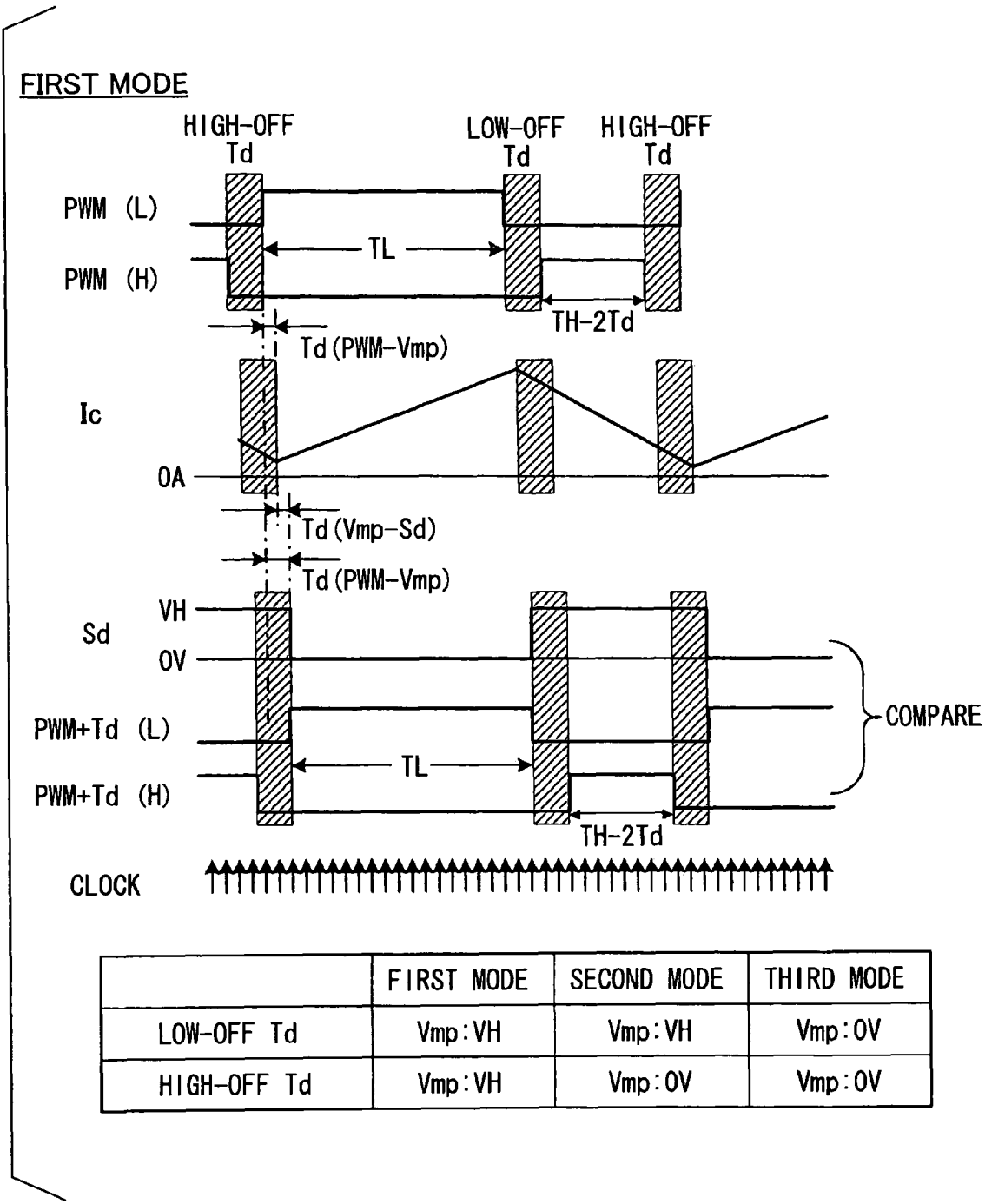
FIG. 4 is an operation diagram showing the operation of a delay unit according to the first embodiment.

That is, as shown in FIG. 4, a delay time occurs due to the operation time of the MOSFET that constitutes the switches SW1 and SW2 since the PWM signal that is output from the PWM signal generation unit 20 to the power converter circuit 10 changes until the increase/decrease direction of the coil current is inverted to change the voltage at the measurement point. A delay occurs until the voltage at the measurement point is input to the operation mode determination unit 46 through the protection circuit 24 and the noise filter 26 after the voltage has been divided by the detector circuit 22.

Under this circumstance, the PWM signal that has been generated by the PWM signal generation unit 20 is delayed by the delay unit 44 by a time obtained by adding the above respective delay times together, thereby making the time axes of the PWM signal that is input to the operation mode determination unit 46 and the detection signal coincide with each other.

The delay time is different according to the elements that constitute the power converter circuit 10, the detector circuit 22, the protection circuit 24, and the noise filter 26, or a variation in the transmission lines of the PWM signal and the detection signal even in the power conversion device having the dame configuration.

Under this circumstance, in this embodiment, the measurement results of measuring the delay time since the PWM signal from the PWM signal generation unit 20 changes until the detection signal that is input to the operation mode determination unit 46 changes by actually operating the power conversion device are stored in the delay time memory unit 42.

The operation mode determination unit 46 samples the PWM signal and the detection signal in synchronism with the operation clock of the FPGA (FIG. 4) which constitutes the operation mode determination unit 46. Then, the operation mode determination unit 46 determines which of the first, second, and third modes the present operation mode is based on the signal level of the detection signal during the dead time period after the respective switches SW1 and SW2 which can be determined by the sampled PWM signal have turned off.

That is, the operation mode determination unit 46 determines that the operation mode is the first mode according to a table indicated at the bottom of FIG. 4 when both of the detection signals Sd during the dead time period after the respective switches SW1 and SW2 have turned off are high level (VH). The operation mode determination unit 46 determines that the operation mode is the second mode when the detection signal during the dead time period after the high side switch SW1 has turned off is low level (0V), and the detection signal during the dead time period after the low side switch SW2 has turned off is high level (VH). The operation mode determination unit 46 determines that the operation mode is the third mode when both of the detection signals during the dead time period after the respective switches SW1 and SW2 have turned off are low level (0V).

Figure 5:
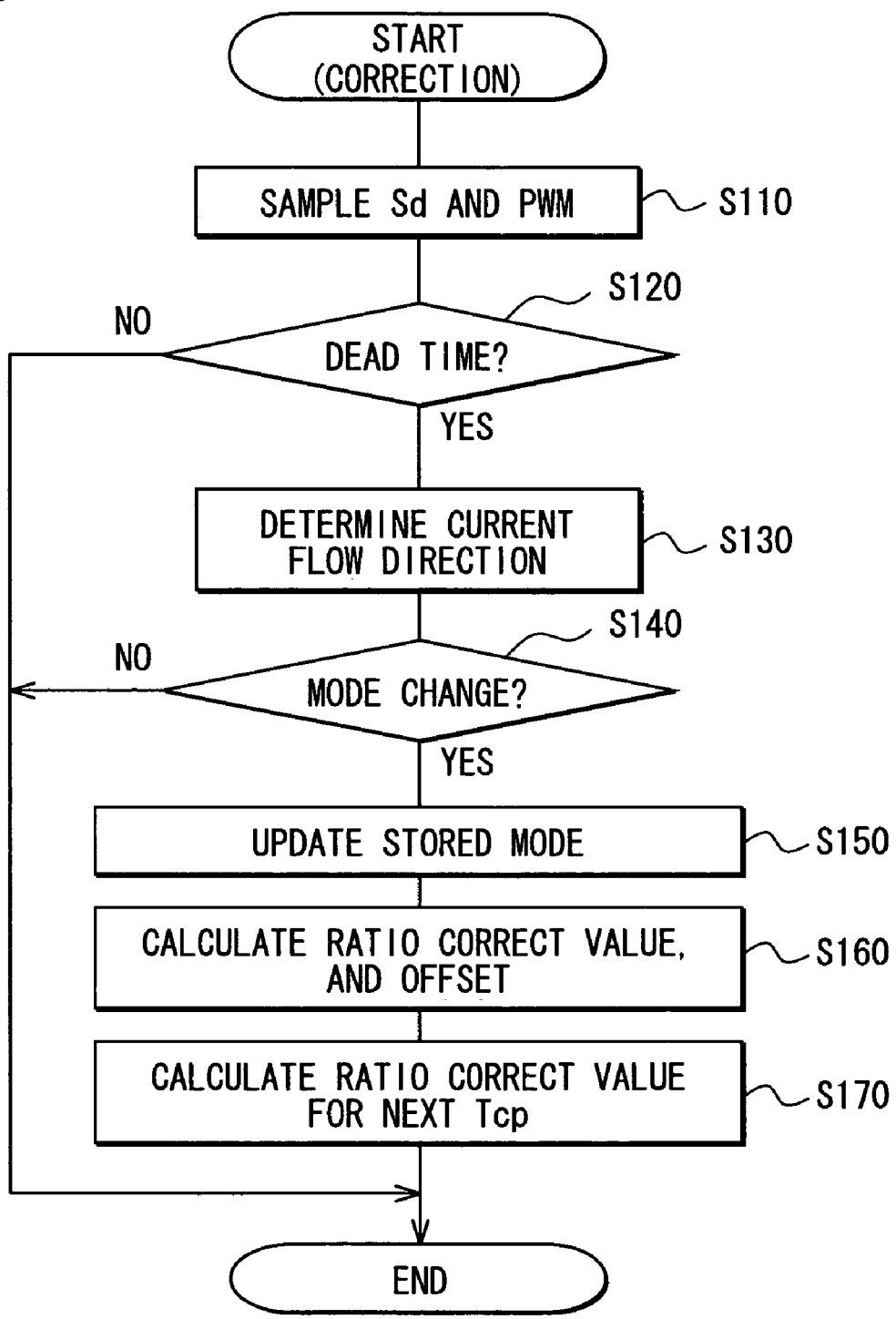
FIG. 5 is a flowchart showing a correction value setting procedure of the correction value calculation unit according to the first embodiment.

FIG. 5 is a flowchart for explaining a setting procedure of a ratio correction value and an offset value Tos in the correction value calculation unit 31. In FIG. 5, the operation of the correction value calculation unit 31 is represented as a correction value setting process that is repetitively executed in synchronism with the operation clock.

As shown in FIG. 5, in the correction value calculation unit 31, the detection signal Sd and the PWM signal that has been subjected to a delay process are first sampled in S110. Then, in S120, it is checked whether the present time is during the dead time period Td after the high side switch SW1 or the low side switch SW2 has turned off based on the time series data of the sampled PWM signal and the present operation mode. Then, when the present time is not during the dead time period, the correction value setting process is terminated once.

When it is determined in S120 that the present time is during the dead time period, the processing is shifted to S130. Then, the direction (increase/decrease direction) of the coil current is determined according to the signal level (0V or VH) of the detection signal that is presently sampled. In a subsequent S140, it is checked whether the operation mode of the power converter circuit 10 changes from the operation mode that is presently stored based on the determination result.

Then, when the operation mode does not change, the correction value setting process is terminated once. When the operation mode changes, the processing is shifted to S150, and the operation mode that is presently stored is updated to the operation mode (any one of the first to third modes) that has been changed.

In a subsequent S160, the ratio correction value corresponding to the operation mode that has been updated and the offset value Tos are calculated according to the table shown in FIG. 2. The calculated ratio correction value is set in the correction unit 18 as a normal correction value that is used in or after the control cycle periods after the next. The calculated offset value Tos is set in the PWM signal generation unit 20 as the offset quantity (time) used in and after the subsequent control cycle periods, and the processing is shifted to S170.

Then, in S170, the ratio correction value (initial correction value) that is used in the initial control cycle period after the operation mode has been updated is calculated based on the amount of change from the ratio correction value (normal correction value) before the operation mode of the ratio correction value (normal correction value) which has been calculated in S160 is updated. The calculated ratio correction value is set in the correction unit 18. The initial correction value is calculated so that the amount of change from the ratio correction value (normal correction value) before the operation mode is updated is twice (2Td or −2Td) as large as the amount of change (Td or −Td) of the specific correction value (normal correction value) that is presently calculated in S160.

As described above, with the updated operation mode, the initial correction value of the ratio correction value, the normal correction value, and the offset value Tos are calculated, and the calculation results are set in the correction unit 18 and the PWM signal generation unit 20. Then, the correction value setting process is terminated once.

As described above, in the power conversion device according to this embodiment, the voltage at the connection point between the high side switch SW1 and the low side switch SW2 in the power converter circuit 10 is divided to generate the detection signal representative of the direction (increase/decrease direction) of the current that flows in the coil L. Then, the direction of the coil current (increase/decrease direction) during the dead time period after the respective switches SW1 and SW2 have turned off is determined based on the detection signal and the PWM signal for the high side switch SW1 which is output from the PWM signal generation unit 20. The operation mode of the power converter circuit 10 is determined based on the determination results to set the ratio correction value and the offset value Tos corresponding to the operation mode.

Figure 6:
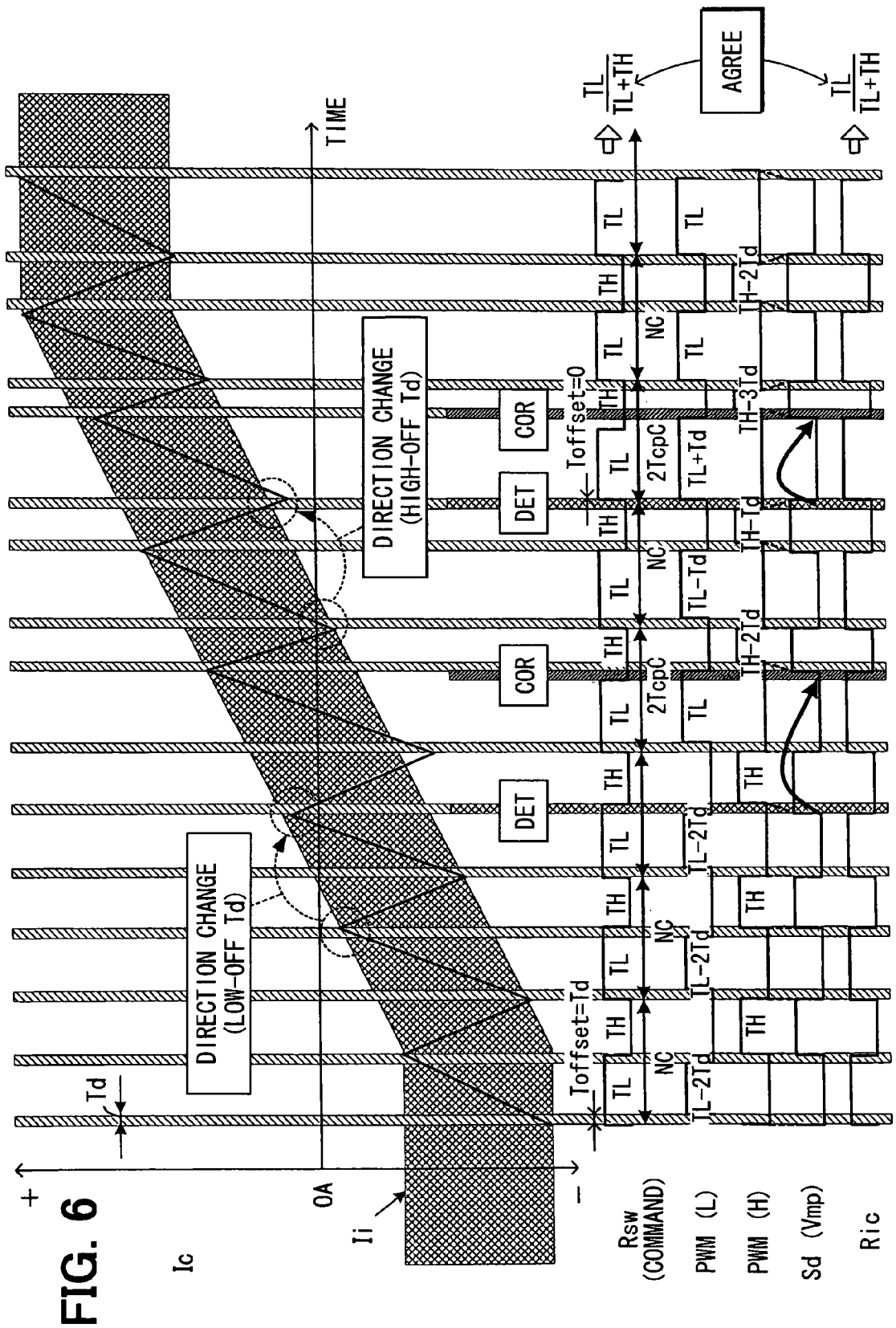
FIG. 6 is an operation diagram showing a change in the coil current and the control operation in the power conversion device according to the first embodiment.
Figure 7:
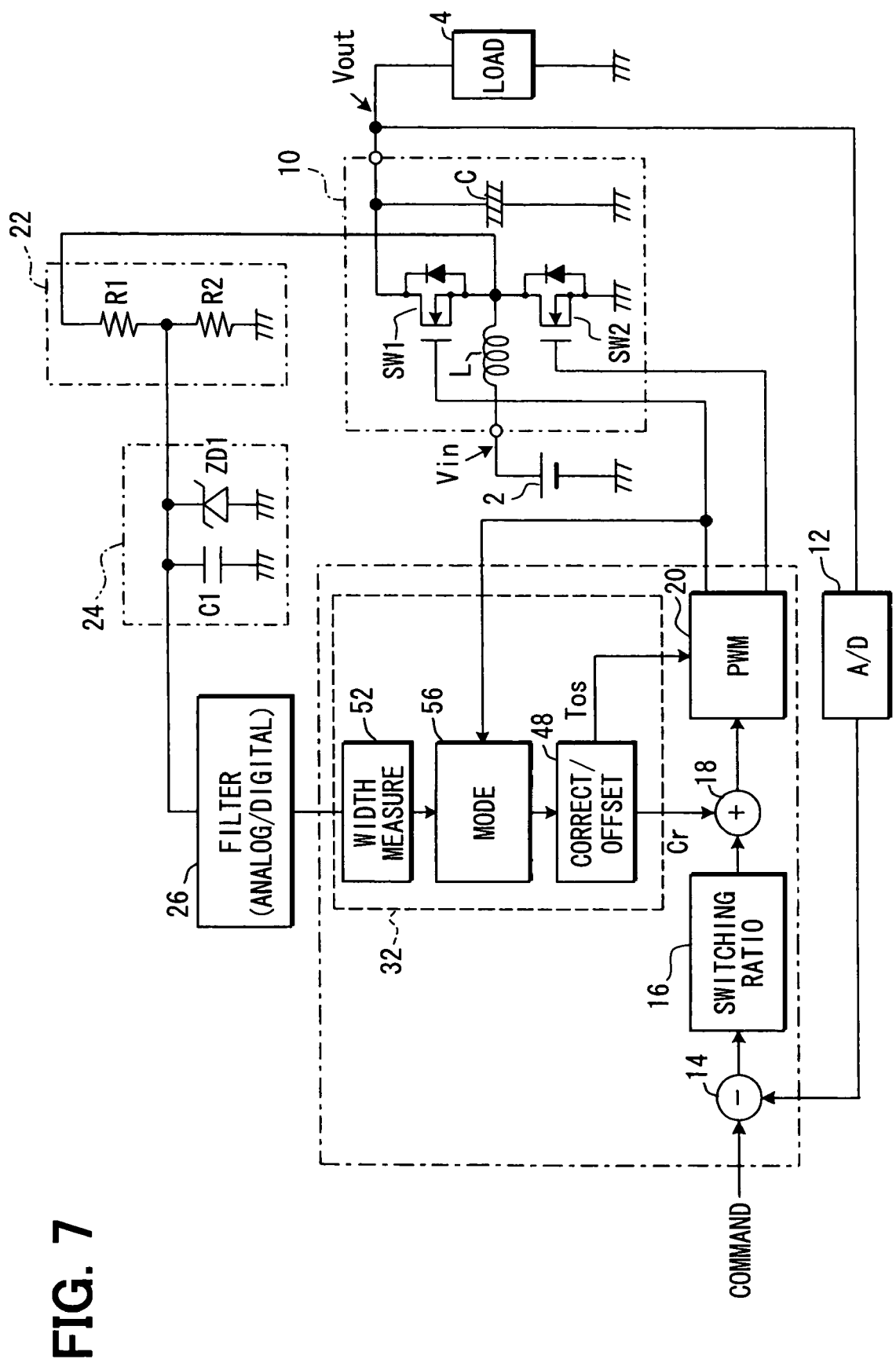
FIG. 7 is a block diagram showing a power conversion device according to a second embodiment of the present invention.

For this reason, for example, as shown in FIG. 6, even if the power consumption of the load 4 changes from negative to positive, and the operation mode of the power converter circuit 10 changes from the third mode to the second mode and the first mode, the changes are rapidly detected based on the direction of the coil current Ic during the dead time period after the respective switches SW1 and SW2 have turned off. As a result, it is possible to set the ratio correction value and the offset value Tos to appropriate values corresponding to the changed operation modes.

As is apparent from FIG. 6, in this embodiment, when a change in the operation mode is detected according to a change in the current direction during the dead time period, the offset value Tos of the PWM signal generation unit 20 is changed in correspondence with the operation mode in the subsequent control cycle period. The ratio (on-time) Rsw of the PWM signals for the respective switches SW1 and SW2 is corrected by the ratio correction value (initial correction value) which has been updated with the amount of correction for two control cycle periods including the control cycle period that detects a change in the operation mode and a subsequent control cycle period. In the control cycle periods after the next, the ratio (on-time) of the PWM signals for the respective switches SW1 and SW2 is corrected by the ratio correction value (normal correction value) corresponding to the operation mode.

For this reason, according to the power conversion device of this embodiment, even if the operation mode of the power converter circuit 10 changes due to a change in the power consumption of the load 4, the increase/decrease ratio of the coil current that flows in the coil L can be controlled to the switching ratio (TL/TL+TH) that has been calculated in the switching ratio calculation unit 16. As a result, it is possible to improve the control precision of the output voltage Vout.

In the above embodiment, the deviation calculation unit 14, the switching ratio calculation unit 16, the correction unit 18, the PWM signal generation unit 20, and the correction value calculation unit 33 are constituted by FPGA. Therefore, the operation clock is set in a cycle that is sufficiently shorter than the control cycle period and the dead time period of the power converter circuit 10. As a result, the ratio correction value and the offset value of the PWM signal can be corrected simply and with a high precision. Because the operation of FPGA can be programmed, the control operation of the power conversion device can be changed according to the load 4 to be connected.

The above respective units can be formed of a digital circuit such as ASIC or CPU other than FPGA. Alternatively, those units can be realized by an analog circuit.

In the power conversion device according to this embodiment, the detector circuit 22 that is formed of a voltage divider circuit corresponds to coil current detecting means, the protection circuit 24 corresponds to protecting means, and the noise filter 26 corresponds to filter means.

The deviation calculation unit 14 and the switching ratio calculation unit 16 among the respective units formed of FPGA as the digital circuit corresponds to switching ratio setting means. The PWM signal generation unit 20 corresponds to PWM signal generating means.

In the correction value calculation unit 31, the delay unit 44 corresponds to delay means, the delay time memory unit 42 corresponds to delay time storing means, the operation mode determination unit 46 corresponds to current direction determining means, and the ratio correction/offset value setting unit 48 and the correction unit 18 correspond to PWM signal correcting means.

Second Embodiment

According to a second embodiment, a correction value calculation unit 32 includes a pulse width measurement unit 52 that measures the pulse width of the detection signal, and an operation mode determination unit 56 that determines the operation mode of the power converter circuit 10 by the pulse width of the detection signal that has been measured by the pulse width measurement unit 52. The operation mode determination unit 46, the delay unit 44, and the delay time memory unit 42 in the first embodiment are not provided in the second embodiment.

The operation mode determination unit 56 takes in the PWM signal of the high side switch SW1 that has been generated by the PWM signal generation unit 20. Then, the operation mode determination unit 56 compares the pulse width of the taken PWM signal with the pulse width of the detection signal that has been measured by the pulse width measurement unit 52 (ratio of the PWM signal and the ratio of the detection signal) to determine the direction of the coil current during the dead time period, and particularly the operation of the power converter circuit 10.

Figure 8:
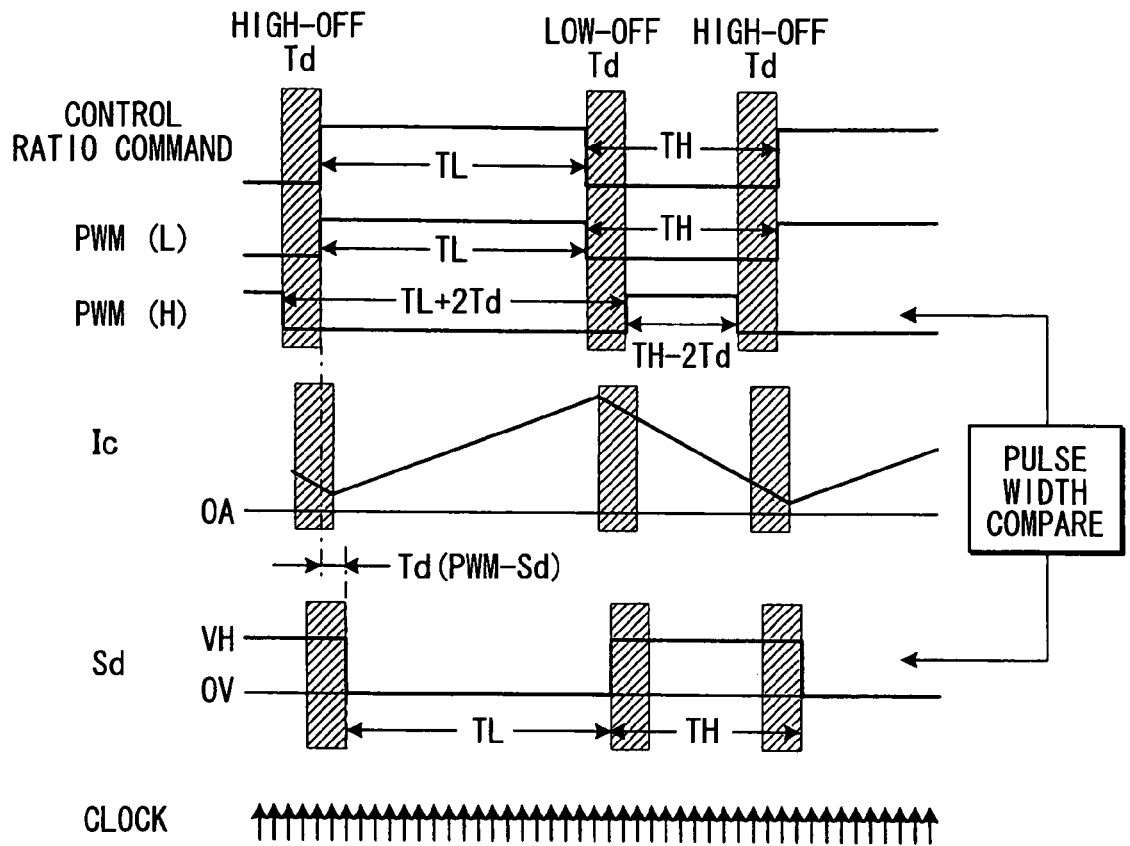
FIG. 8 is an operation diagram showing the operation of a pulse width measuring unit and an operation mode determination unit according to the second embodiment.

That is, as shown in the bottom of FIG. 8, a relationship between the pulse width of the PWM signal of the high side switch SW1 and the pulse width of the detection signal is different according to the operation mode of the power converter circuit 10. In the first mode (Imin≧0) where the coil current Ic is a positive value, the pulse width of the PWM signal (high level) is shorter than the pulse width of the detection signal (Sd width) twice time (2Td) as long as the dead time Td. In the second mode (Imin<0<Imax) where the coil current Ic changes across 0 A, the pulse width of the PWM signal (high level) is shorter than the pulse width of the detection signal (Sd width) by the dead time Td. In the third mode (Imax≦0) where the coil current is a negative value, the pulse width of the PWM signal (high level) and the pulse width of the detection signal (Sd width) coincide with each other.

Figure 9:
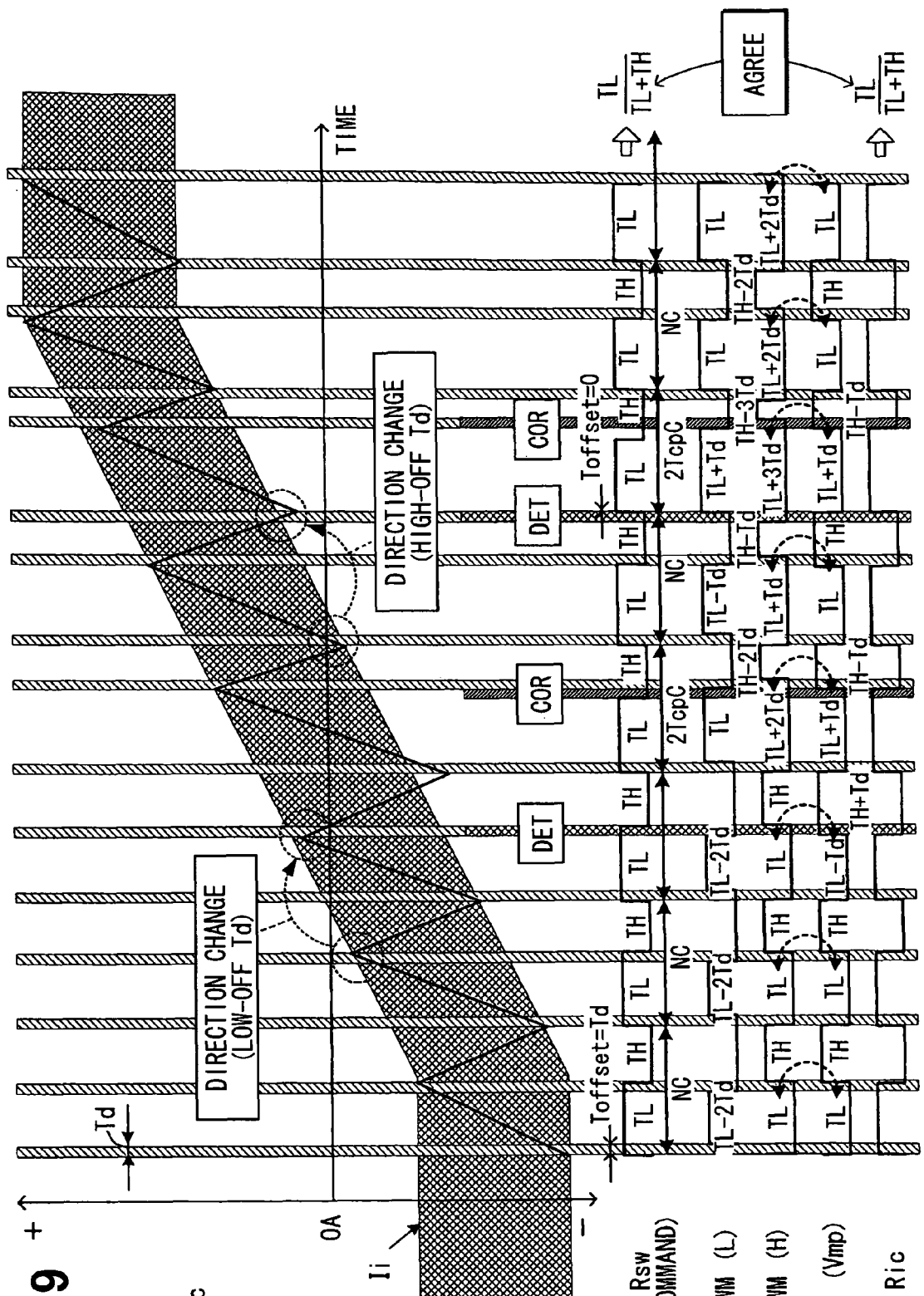
FIG. 9 is an operation diagram showing a change in the coil current and the control operation in the power conversion device according to the second embodiment.

Under the above circumstance, as exemplified in FIG. 9, in the operation mode determination unit 46, the pulse width of the PWM signal for the high side switch SW1 and the pulse width of the detection signal are sequentially compared with each other to determine the operation mode of the power converter circuit 10. The determined operation mode is output to the ratio correction/offset value setting unit 48 to set the ratio correction value and the offset value Tos to appropriate values corresponding to the operation mode as in the first embodiment.

For this reason, in the second embodiment, the same advantages as those in the first embodiment can be obtained. In order to make the time axes of the PWM signal and the detection signal coincide with each other, it is unnecessary to delay the PWM signal. As a result, the correction value calculation unit 32 can be constituted simpler than the correction value calculation unit 31 of the first embodiment.

Third Embodiment

Figure 10:
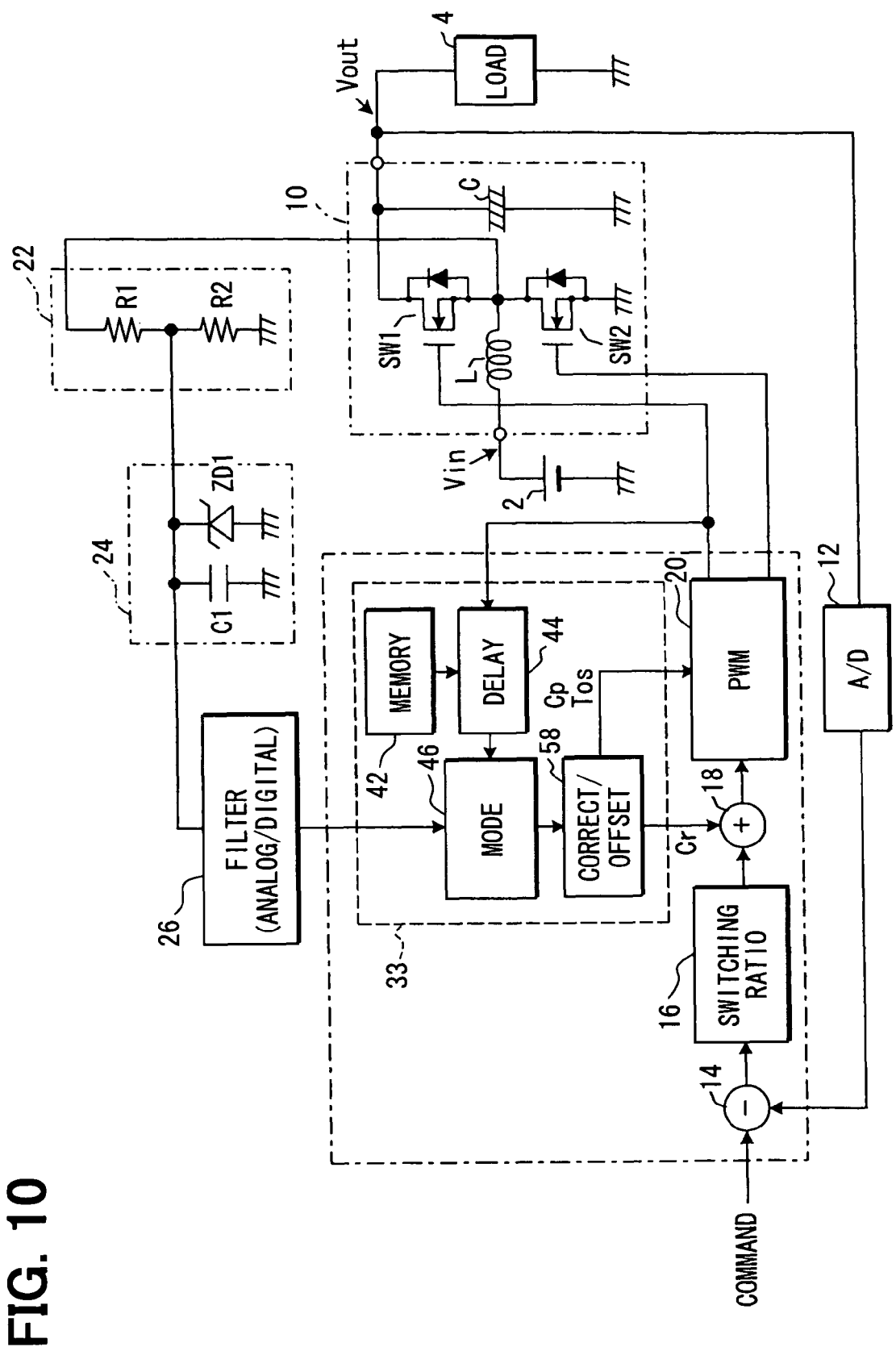
FIG. 10 is a block diagram showing a power conversion device according to a third embodiment of the present invention.

According to a third embodiment shown in FIG. 10, the PWM signal generation unit 20 is so configured as to adjust the cycle (control cycle period) per se of the PWM signal in addition to the ratio of the PWM signal and the offset quantity (time). Further the correction value calculation unit 33 includes the ratio and cycle correction/offset value setting unit 58 instead of the ratio correction/offset value setting unit 48.

Figure 11:
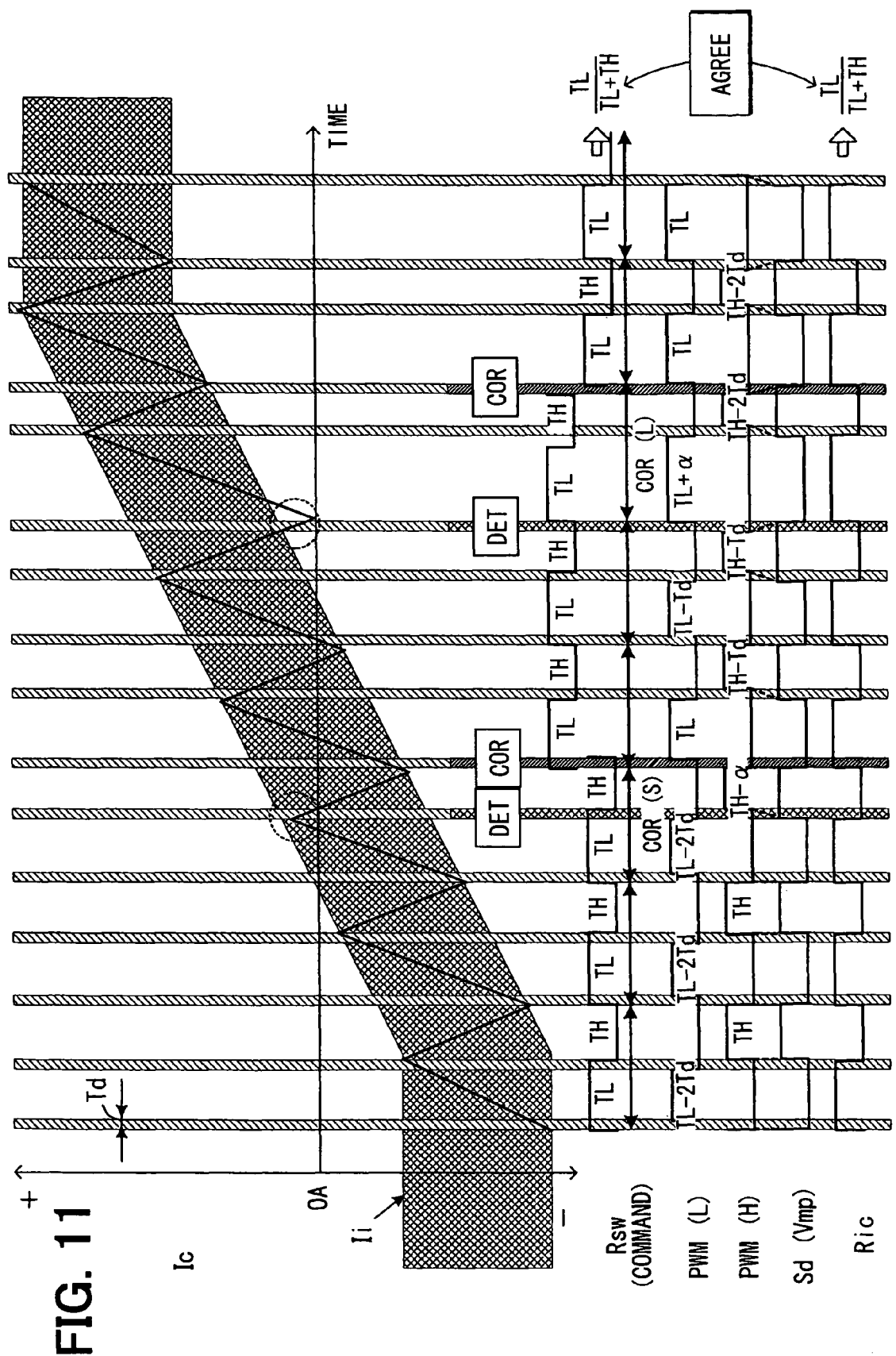
FIG. 11 is an operation diagram showing a change in the coil current and the control operation in the power conversion device according to the third embodiment.
Figure 12:
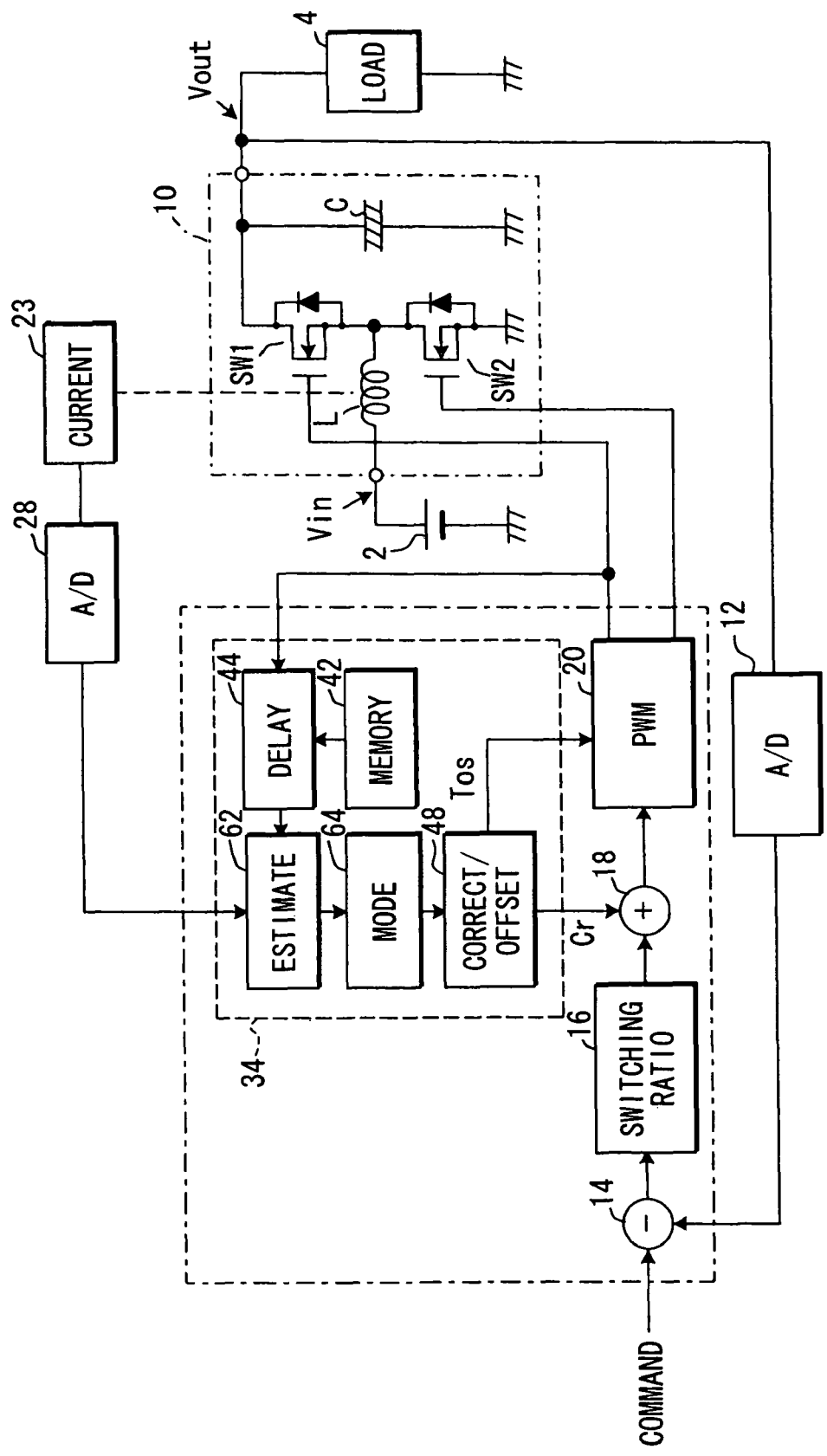
FIG. 12 is a block diagram showing a power conversion device according to a fourth embodiment of the present invention.

That is, as exemplified in FIG. 11, when the operation mode changes from the third mode to the second mode to reduce the time TL in the coil current increase direction within one control cycle period by the dead time Td, the control cycle period can be shortened in order that the increase/decrease ratio of the coil current is controlled to the switching ratio within the control cycle period. This is shown in FIG. 11 as a small cycle correction COR(S).

When the operation mode changes from the second mode to the first mode to lengthen the time TH in the coil current decrease direction within one control cycle period by the dead time Td, the control cycle period can be lengthened in order that the increase/decrease ratio of the coil current is controlled to the switching ratio within the control cycle period. This is shown as a large cycle correction COR(L) in FIG. 11.

In this embodiment, when the operation mode that is determined by the operation mode determination unit 46 changes, the ratio and cycle correction/offset value setting unit 58 obtains the correction quantity α of the control cycle period according to the change direction of the time TL or TH caused by the change in the operation mode. Then, the present control cycle period is increased or decreased by the correction quantity α to correct the control cycle period, and the increase/decrease ratio of the coil current in each of the control cycle periods is made to correspond to the switching ratio that is an object to be controlled.

For example, in the case of the cycle correction (small), the correction quantity α can be obtained by solving the following expression.

$$TL/TL+TH=(TL-2Td)/(TL-2Td+TH-\alpha)$$

Accordingly, when the operation mode changes, that is, when the direction of the coil current during the dead time period changes, the increase/decrease ratio of the coil current can be so corrected as to correspond to the switching ratio within the control cycle period. As a result, it is possible to further improve the control precision of the output voltage Vout.

In this embodiment, the ratio and cycle correction/offset value setting unit 58 calculates the ratio correction value and the offset value, and updates the ratio correction value and the offset value used in the control cycle periods after the control cycle period during which the change in the operation mode is detected in the same procedure as that of the ratio correction/offset value setting unit 48 except that the control cycle period is corrected as described above.

Fourth Embodiment

In a fourth embodiment, the power conversion device differs from the first embodiment in the following two points.

(1) The detector circuit 22, the protection circuit 24, and the noise filter 26 are replaced with a current sensor 23 and an A/D converter 28. The current sensor 23 detects a current (coil current k) that actually flows in the coil L, and the A/D converter 28 converts the current detection signal from the current sensor 23 into digital data.

(2) Within the correction value calculation unit 34, the operation mode determination unit 46 of the first embodiment is replaced with a dead time current estimate unit 62 and an operation mode determination unit 64. The dead time current estimate unit 62 estimates the coil current that flows during the subsequent dead time period based on the detection result of the coil current which is input through the A/D converter 28 and the PWM signals that are input through the delay unit 44. The operation mode determination unit 64 determines the operation mode of the power converter circuit 10 based on the coil current that is estimated by the dead time current estimate unit 62.

Figure 13:
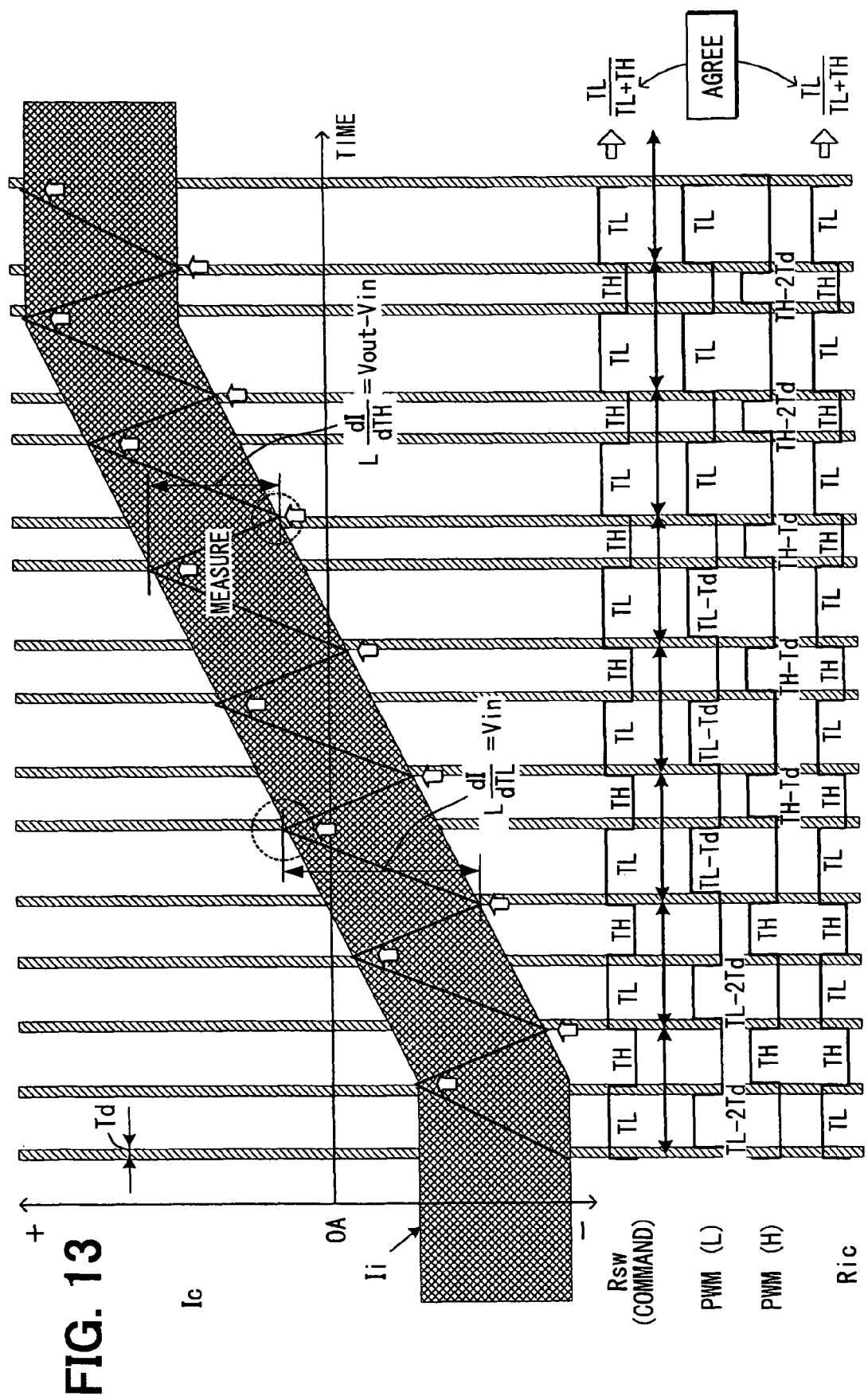
FIG. 13 is an operation diagram showing a change in the coil current and the control operation in the power conversion device according to the fourth embodiment.

That is, as shown in FIG. 13, the coil current Ic at a change point where the increase/decrease direction of the coil current is inverted can be estimated by the use of a coil current at the previous change point and a change ratio (dI/dt) of the coil current from the previous change point to the subsequent change point.

In the case of the step-up type DC/DC converter as in this embodiment, the change ratio (dI/dt) of the coil current when the coil current increases can be calculated from "L·dI/dTL=Vin", and the change ratio (dI/dt) of the coil current when the coil current decreases can be calculated from "L·dI/dTH=Vout−Vin".

Figure 14:
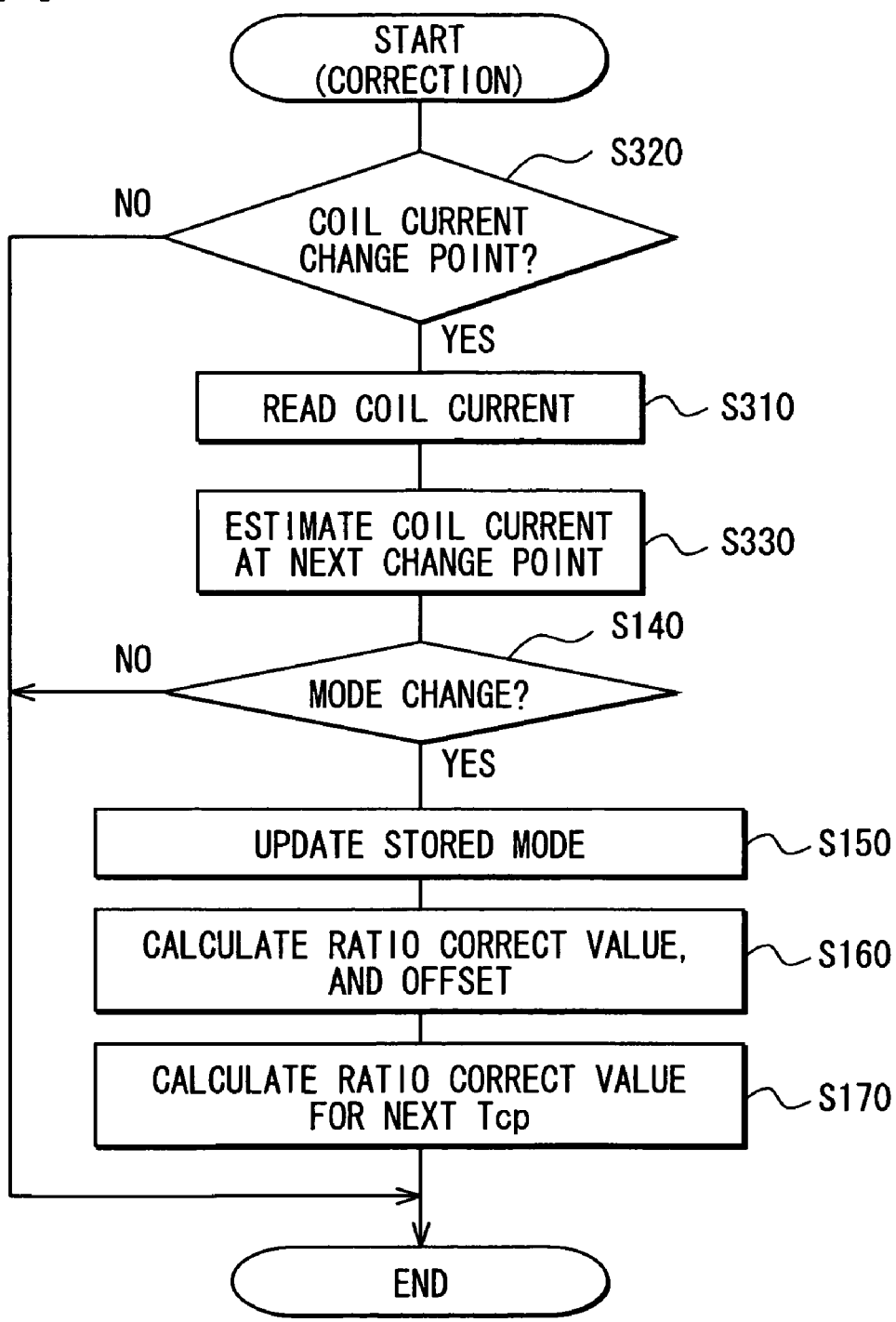
FIG. 14 is a flowchart showing a correction value setting procedure of a correction value calculation unit according to the fourth embodiment.

In the operation mode determination unit 64, a change point at which the increase/decrease direction of the coil current is inverted is detected based on the PWM signal (S310) in the procedure of S310 to S330 shown in FIG. 14. The coil current that actually flows at the change point is taken in through the current sensor 23 and the A/D converter 28 (S320). The coil current at the subsequent change point is estimated based on the taken coil current and the change ratio of the coil current (dI/dt) (S330).

When the coil current at the subsequent change point can be estimated, the direction of the coil current during the subsequent dead time period, and the operation mode can be determined according to the positive or negative of the coil current. Therefore, in the operation mode determination unit 64, the change of the operation mode is determined to calculate and set the ratio correction value and the offset value used in and after the subsequent control cycle periods in the same procedure as that of the first embodiment (S140 to S170 shown in FIG. 14).

Accordingly, in the power conversion device according to this embodiment, the ratio of the PWM signals and the offset quantity can be optimally controlled according to the direction of the coil current during the dead time period as in the first embodiment. As a result, the increase/decrease ratio of the coil current is made to correspond to the switching ratio that is a command value thereof, thereby making it possible to improve the control precision of the output voltage Vout.

In this embodiment, the point at which the coil current is measured is the change point of the coil current which is obtained from the PWM signals. The measurement point can be appropriately changed. However, the coil current during the subsequent dead time period changes according to the switching ratio, that is, the pulse widths of the respective high/low levels of the PWM signals. Therefore, it is necessary to precisely determine the increase/decrease time of the coil current according to the switching ratio when the coil current is estimated.

Fifth Embodiment

Figure 17:
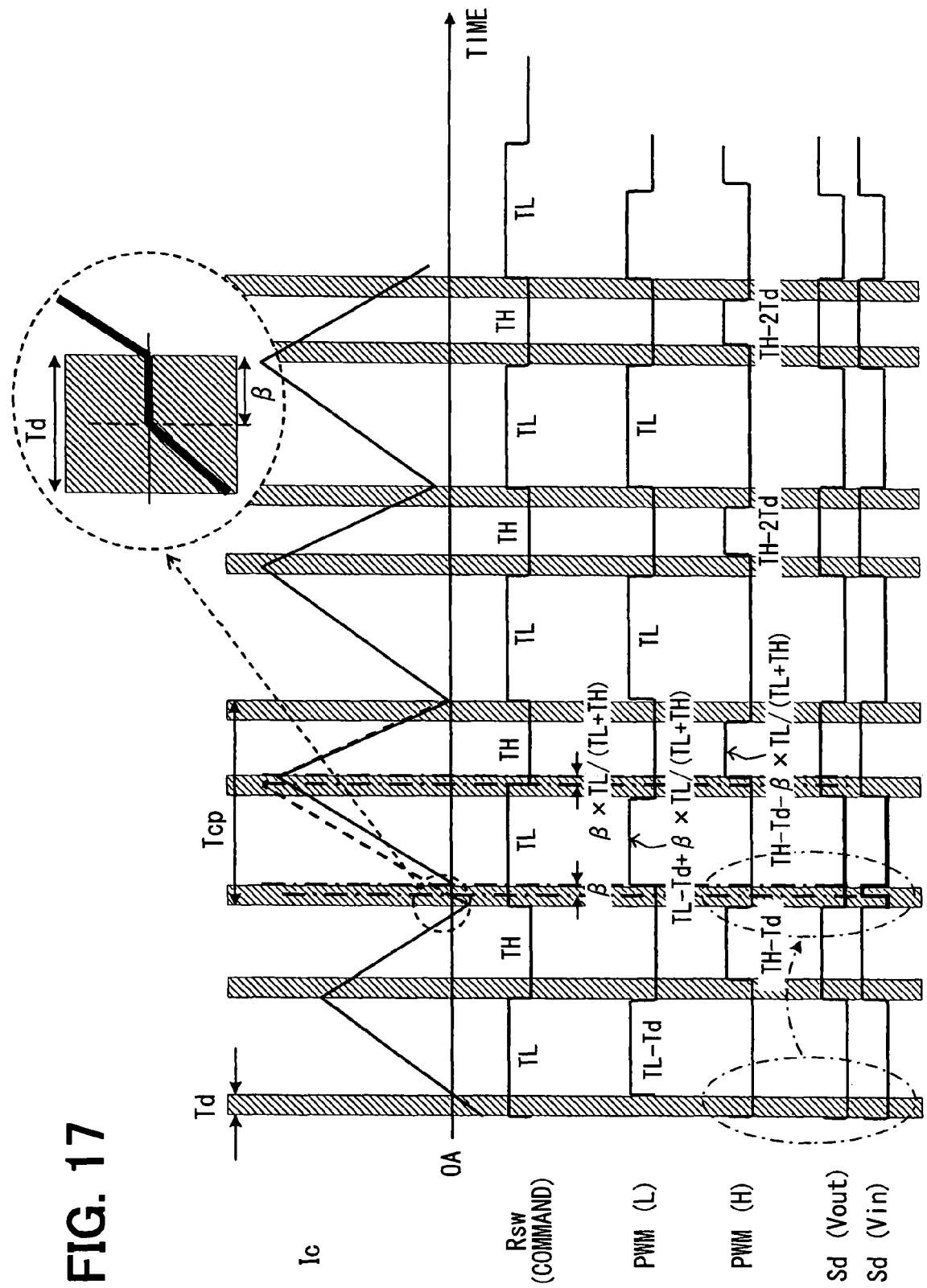
FIG. 17 is an operation diagram showing a method of setting a fine adjustment ratio correction value according to the fifth embodiment.
Figure 18:
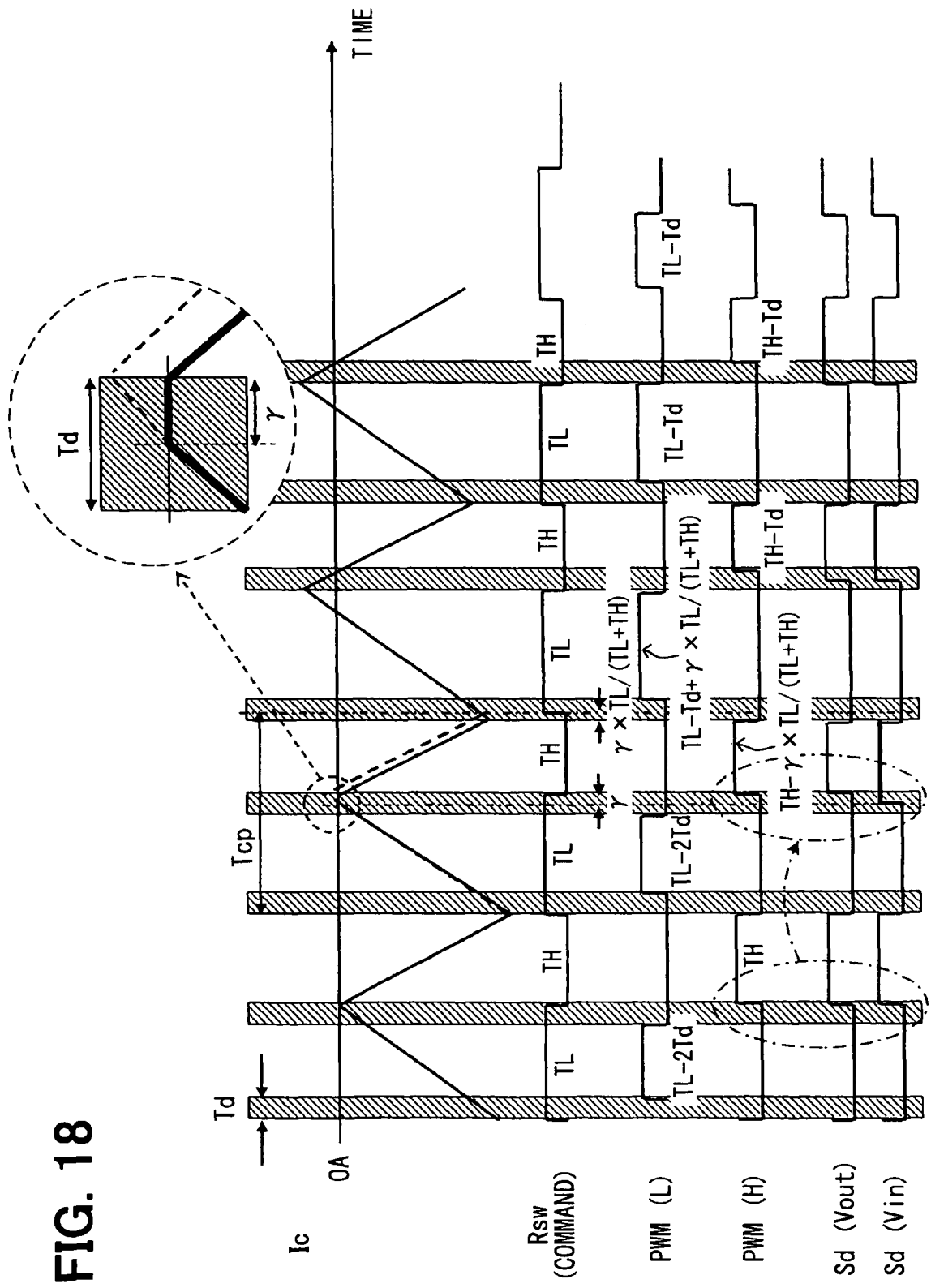
FIG. 18 is an operation diagram showing a method of setting a fine adjustment ratio correction value, likewise.

In a fifth embodiment, as shown in FIGS. 17 and 18, when the coil current becomes 0 A during the dead time period, current zero periods β and γ since that time until the dead time Td is terminated and the coil current starts to flow are measured, and the pulse widths (high level) of the respective PWM signals are finely adjusted to make the increase/decrease ratio of the coil current correspond to the switching ratio that is an object to be measured.

Figure 15:
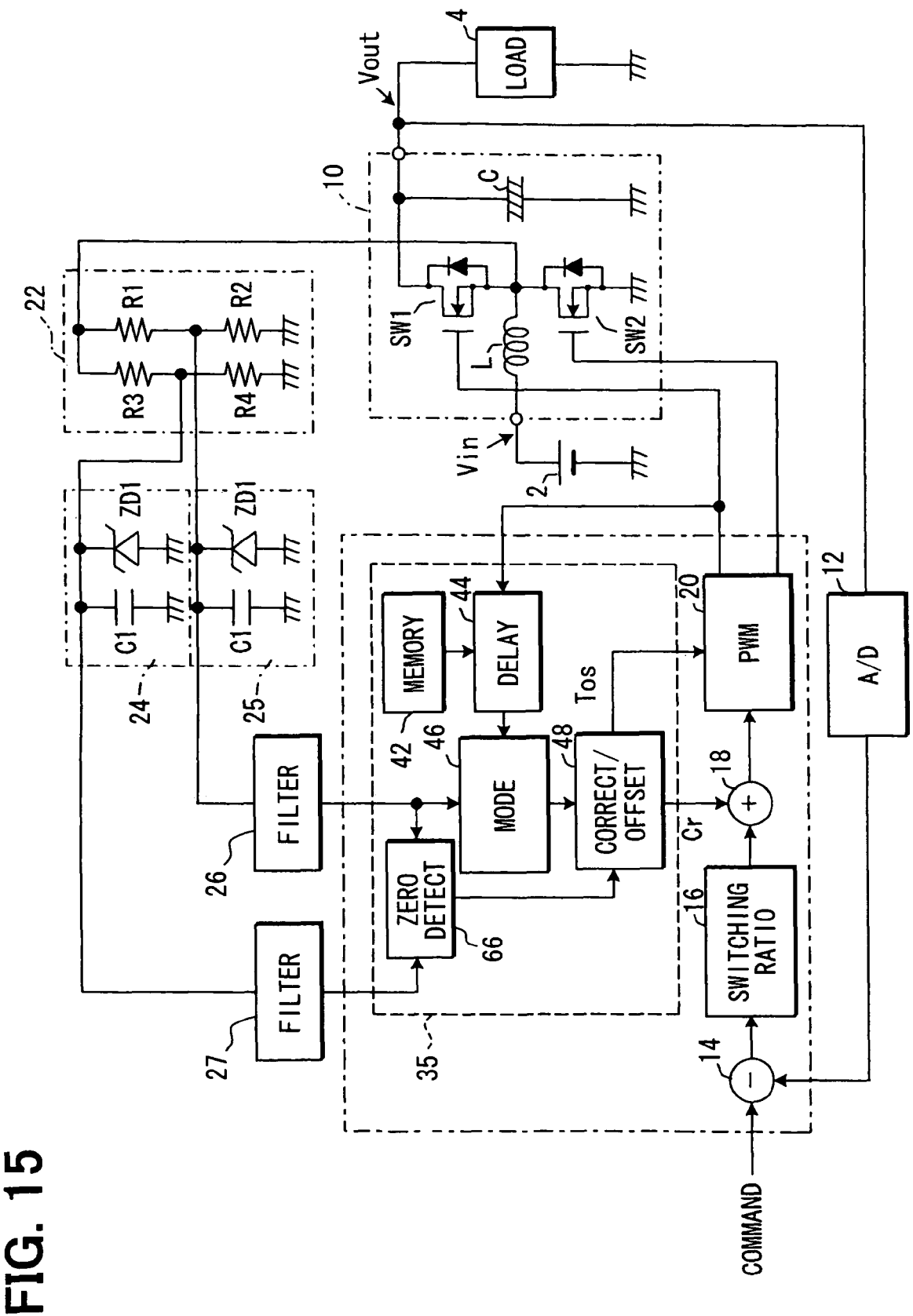
FIG. 15 is a block diagram showing a power conversion device according to a fifth embodiment of the present invention.

For this fine adjustment function, in the power conversion device, as shown in FIG. 15, the detector circuit 22 is equipped with a first voltage divider circuit including resistors R1 and R2, and a second voltage divider circuit including resistors R3 and R4. The voltage at the measurement point is divided by two kinds of voltage divider circuits that are different in the voltage division ratio, and the divided voltages (that is, detection signals) made by the respective voltage divider circuits are input to the correction value calculation unit 35 through the protection circuits 24, 25, and the noise filters 26, 27.

The correction value calculation unit 35 includes a current zero detection unit 66 that detects the current zero period during which the coil current is 0 A based on the two kinds of detection signals that are input through the noise filters 26 and 27 as current zero detecting means.

The detection results made by the current zero detection unit 66 is input to the ratio correction/offset value setting unit 48. When the current zero period is detected by the current zero detection unit 66 during the dead time period, the ratio correction/offset value setting unit 48 calculates the ratio correction value for fine adjustment based on the detected current zero period to output the calculated ratio correction value to the correction unit 18.

That is, first, in the detector circuit 22, the first voltage divider circuit including the resistors R3 and R4 sets the voltage division ratio (resistances of the respective resistors R3 and R4) as follows. That is, the detection signal that is a divided voltage is recognized as the low level at the correction value calculation unit 35 side when the voltage at the measurement point is lower than a determination voltage between 0V (ground potential) and the input voltage Vin. The detection signal is recognized as the high level when the voltage at the measurement point is equal to or higher than the determination voltage. That is, the second voltage divider circuit is an input voltage Vin detection circuit, and its detection signal is input to the current zero detection unit 66 as the input voltage detection signal (FIGS. 17 and 18).

The second voltage divider circuit including the resistors R1 and R2 sets the voltage division ratio (resistances of the respective resistors R1 and R2) as follows. That is, the detection signal that is a divided voltage is recognized as the low level at the correction value calculation unit 35 side when the voltage at the measurement point is lower than a determination voltage between the input voltage Vin and the output voltage Vout. The detection signal is recognized as the high level when the voltage at the measurement point is equal to or higher than the determination voltage. That is, the first voltage divider circuit is an output voltage Vout detection circuit, and its detection signal is input to the current zero detection unit 66 as the output voltage detection signal (FIGS. 17 and 18). The detection signal is input to the operation mode determination unit 46, and used to detect the direction of the current during the dead time period to determine the operation mode as in the first embodiment.

Figure 16:
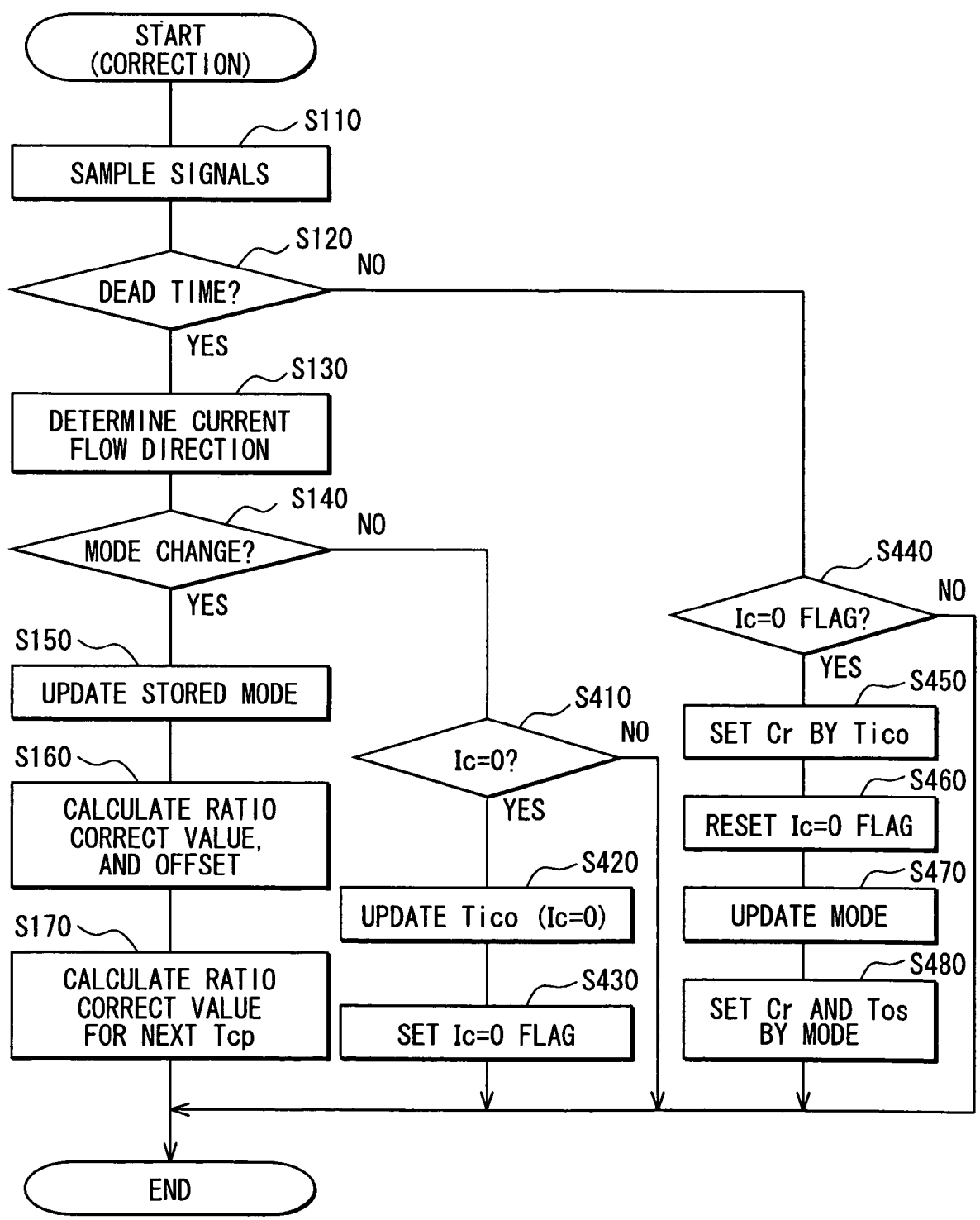
FIG. 16 is a flowchart showing a correction value setting procedure of a correction value calculation unit according to the fifth embodiment.

In the correction value calculation unit 35, with the addition of the current zero detection unit 66, the current zero period is determined in a procedure (S410 to S460) shown in FIG. 16 to calculate the ratio correction value for the PWM signal fine adjustment and set the calculated ratio correction value in the correction unit 18.

Hereinafter, the operation of the correction value calculation unit 35 will be described.

As shown in FIG. 16, in the correction value calculation unit 35, the direction of the coil current (operation mode) is determined during the dead time period in the same procedure as that of the correction value calculation unit 31 according to the first embodiment. When the operation mode changes, the ratio correction value (normal correction value) and the offset value corresponding to the operation mode that has been changed, and the ratio correction value (initial correction value) for the subsequent control cycle period are calculated, and then set in the correction unit 18 and the PWM signal generation unit 20 (S110 to S170).

Then, when the operation mode does not change during the dead time period (NO in S140), it is checked in S410 whether the coil current is zero based on the input voltage detection signal and the output voltage detection signal described above.

That is, when the coil current is 0 A, since the voltage at the measurement point becomes the input voltage Vin, the input voltage detection signal becomes high level, and the output voltage detection signal becomes low level (FIGS. 17 and 18). In S410, it is checked whether the input voltage detection signal and the output voltage detection signal are different in level from each other, thereby determining whether the coil current is 0 A.

The processing in S140 represents the current zero determining operation in the current zero detection unit 66, and the current zero detection unit 66 detects that the coil current becomes 0 A according to the two kinds of detection signals as described above.

Then, when it is not determined that the coil current is zero in S410, the correction value setting process is terminated once. When it is determined that the coil current is zero, a counter for measuring the coil current zero period counts up (+1) to update the measured value of the current zero period in S420. Further, in S430, after the current zero period measurement flag has been set, the correction value setting process is terminated once.

The correction value setting process shown in FIG. 16 is repetitively executed in synchronism with the operation clock as in the first embodiment shown in FIG. 5. Therefore, the processing of S410 to S430 is repetitively executed until the dead time period is terminated after the coil current becomes 0 A during the dead time period.

Then, when it is determined in S120 that the present time is not during the dead time period, it is checked in S440 whether the measurement flag of the current zero period has been set. Then, when the measurement flag is not set, the correction value setting process is terminated once.

On the other hand, when it is determined in S120 that the measurement flag has been set, the current zero period during the dead time period is obtained according to a value of the current zero period measurement counter in S450. The ratio correction value for the PWM signal fine adjustment is calculated based on the current zero period, and the calculated ratio correction value is set in the correction unit 18 to reset the measurement flag of the current zero period in S460.

Then, in a subsequent S470, it is assumed that the operation mode changes to the operation mode at a side where the coil current (Imin or Imax) during the current zero period has passed through 0 A, and the operation mode that is presently stored is updated the operation mode that has been changed. In a subsequent S480, the ratio correction value and the offset value Tos corresponding to the operation mode that has been updated are calculated according to a table shown in FIG. 2, and set in the PWM signal generation unit 20 as the offset quantity (time) used in and after the subsequent control cycle period. Then, the correction value setting process is terminated once.

The ratio correction value for the fine adjustment is to correct the on-times of the respective PWM signals by the quantity of current that did not flow in the coil L during the current zero period within one control cycle period after the current zero period detection, and to make the increase/decrease ratio of the coil current correspond to the switching ratio. The ratio correction value for the fine adjustment is set as exemplified in FIGS. 17 and 18.

That is, as shown in FIG. 17, in the case where the operation mode is the second mode, when the coil current becomes 0 A during the dead time period after the high side switch SW1 turns off, the amount of current that flows in the coil L is reduced by the current zero period β (time TL is shortened).

In this case, the ratio correction value is calculated as "β×TL/(TL+TH)". The on-time of the PWM signal which allows the low side switch SW2 to turn on then increases from the reference time "TL−Td" within the present control cycle period by the ratio correction value (=TL−Td+β×TL/(TL+TH)) with respect to the correction unit 18. Then, the on-time of the PWM signal which allows the high side switch SW1 to turn on decreases from the reference time "TH−Td" within the present control cycle period by the ratio correction value (=TH−Td−β×TL/(TL+TH)).

On the other hand, as shown in FIG. 18, in the case where the operation mode is the third mode, when the coil current becomes 0 A during the dead time period after the low side switch SW2 has turned off, the amount of current that flows in the coil L is reduced by the current zero period γ (time TL is shortened). However, because the dead time period after the low side switch SW2 has turned off is an intermediate point of one control cycle period, a period during which the high side switch SW1 then turns on and a period during which the low side switch SW2 turns on after the next are different in the control cycle period.

In this case, the ratio correction value is calculated as "γ×TL/(TL+TH))". The on-time of the PWM signal which allows the high side switch SW1 to turn on then decreases from the reference time "TH" within the present control cycle period by the ratio correction value (=TH−γ×TL/(TL+TH)) with respect to the correction unit 18. Then, the on-time of the PWM signal which allows the low side switch SW2 to turn on increases from the reference time "TH−Td" within the subsequent control cycle period (that is, after the operation mode has been updated) by the ratio correction value (=TH−Td+γ×TL/(TL+TH)).

Although not described in detail with reference to the figures, in the case where the power consumption at the load 4 reduces from positive to negative to gradually reduce the coil current conversely to a change in the coil current shown in FIGS. 17 and 18, when the coil current becomes 0 A during the dead time period, the amount of current that flows in the coil L increases by the current zero period (time TH is shortened).

In this case, the current zero period is multiplied by "TH/(TL+TH)" to obtain the ratio correction value. With one control cycle period time after that, the on-time of the PWM signal during which the low side switch SW2 turns on is shortened by the ratio correction value. The on-time of the PWM signal during which the high side switch SW1 turns on is lengthened by the ratio correction value. With the above operation, the increase/decrease ratio of the coil current is made to correspond to the switching ratio.

As described above, in this embodiment, the operation mode is determined from the current direction during the dead time period to set the ratio correction value and the offset value, as in the power conversion device according to the first embodiment. In addition, when the coil current becomes 0 A during the dead time period, the current zero period is measured, and the ratio correction value for fine adjustment corresponding to the amount of current that did not flow in the current zero period is obtained according to the current zero period and the direction of the coil current that flows during the dead time period. Thus, the ratio of the PWM signal is finely adjusted with the use of the ratio correction value.

For this reason, as compared with the power conversion devices of the above respective embodiments, the increase/decrease ratio of the coil current can be made to more precisely correspond to the switching ratio, thereby making it possible to improve the control precision of the output voltage Vout.

Modified Example

In the above embodiments, various changes may be made without departing from the scope of the invention.

For example, in the power conversion devices according to the first to third embodiments, the detector circuit 22 divides the voltage at the measurement point which is a connection point between the high side switch SW1 and the low side switch SW2 by the two resistors R1 and R2. Alternatively, the detector circuit 22 may be formed as shown in FIG. 19A to 19C.

Figure 19A:
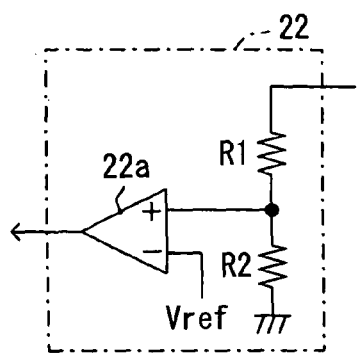
FIGS. 19A to 19C are circuit diagrams showing another structural example of the detector circuit.

That is, the detector circuit 22 shown in FIG. 19A includes a comparator 22a that compares the divided voltage with a reference voltage Vref for high/low determination, and outputs the detection signal of the high level when the divided voltage is higher than the reference voltage Vref in addition to the voltage division resistors R1 and R2. Accordingly, with the use of the detector circuit 22, it is unnecessary to conduct the level determination of the divided voltage at the correction value calculation units 31 to 33, and the correction value calculation units 31 to 33 can be more simply constituted.

Figure 19B:
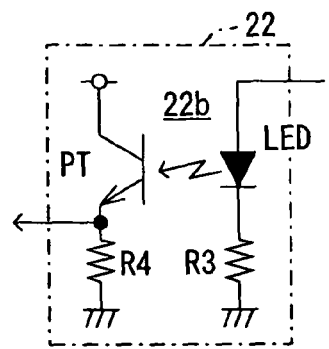

The detector circuit 22 shown in FIG. 19B is formed of a photo coupler 22b including a light emission element (LED) that can be energized through a current limit resistor R3 from the measurement point, and a light sensitive element (photo transistor PT) that receives a light from the light emission element (LED) to generate a light receiving signal. The detection signal is generated by a current detection resistor R4 that converts a current that flows in the light sensitive element (photo transistor PT) into a voltage signal. Accordingly, according to the detector circuit 22, the power converter circuit 10 and the correction value calculation unit 31 can be electrically isolated from each other. As a result, the detector circuit 22 per se can function as a surge absorption protection circuit.

Figure 19C:
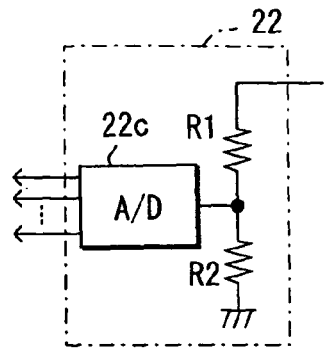

The detector circuit 22 shown in FIG. 19C includes an A/D converter 22c that converts the divided voltage into digital data in addition to voltage division resistors R1 and R2. Accordingly, according to the detector circuit 22, digital data representative of the measurement point voltage can be input to the correction value calculation units 31 to 33, and the direction of the coil current can be determined at the correction value calculation units 31 to 33 based on the input data.

The detector circuit 22 shown in FIG. 19C can be used in the power conversion device of the fifth embodiment. That is, in the fifth embodiment, it is necessary to determine whether the coil current is 0 A, at the correction value calculation unit 35. In order to achieve the above, it is necessary to discriminate whether the measurement point voltage is 0V (ground potential), the input voltage Vin, or the output voltage Vout. When the detector circuit 22 is the detector circuit shown in FIG. 19C, the correction value calculation unit 35 can readily determine which of 0V, Vin, and Vout the measurement point voltage is based on the input data from the detector circuit 22.

The detector circuit 22 is used to convert the measurement point voltage into a voltage that allows the direction of the coil current to be determined by the correction value calculation unit 35. When the output voltage Vout and the supply voltage of the correction value calculation unit 35 are equal or close to each other, the direction of the coil current can be determined by the correction value calculation unit 35 even if the measurement point voltage is input to the correction value calculation unit 35. In this case, it is possible that the detector circuit 22 is formed by a buffer circuit, and the measurement point voltage is input to the correction value calculation unit 35.

Figure 20:
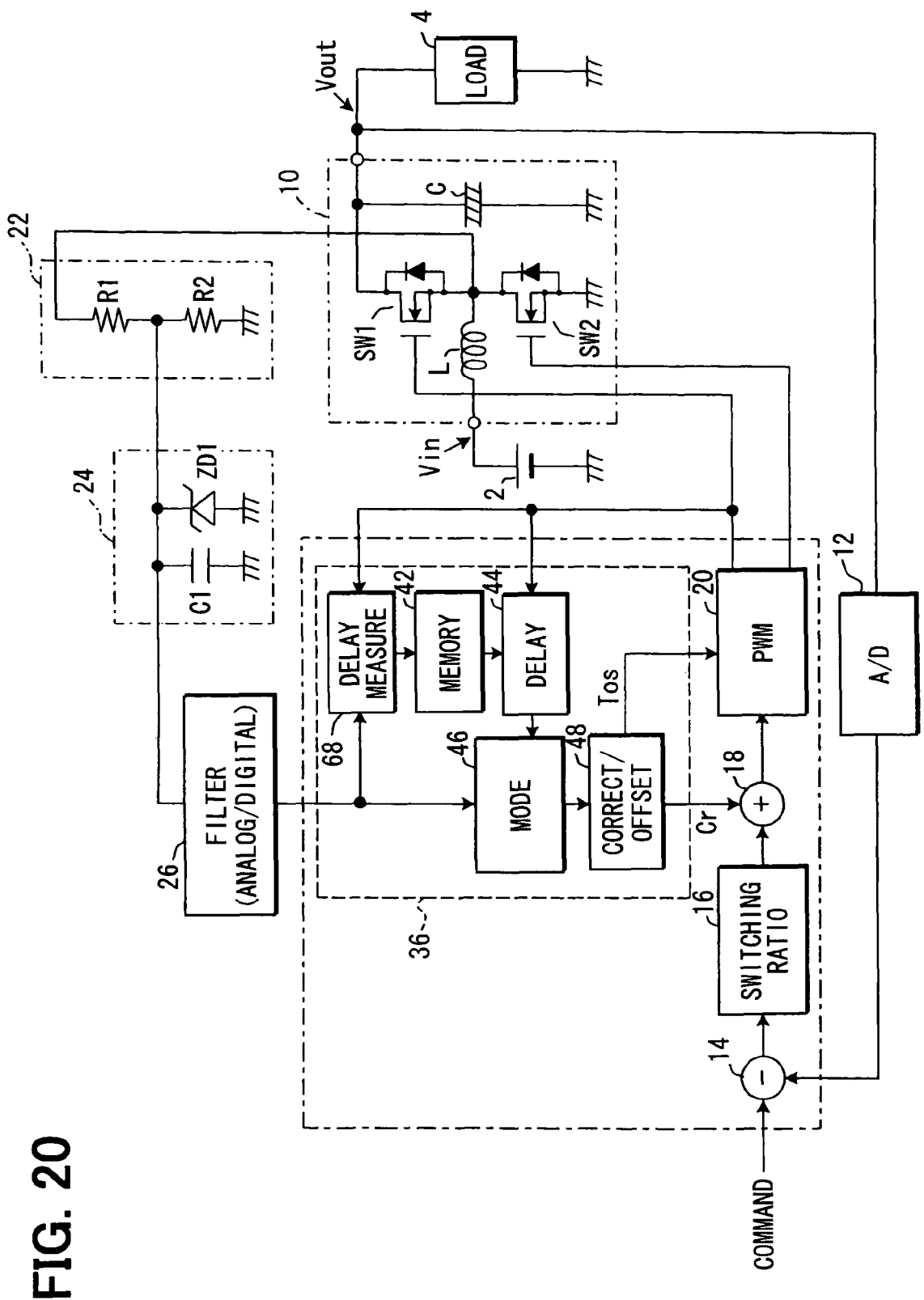
FIG. 20 is a block diagram showing a power conversion device having a delay time measurement unit in the correction value calculation unit.
Figure 22:
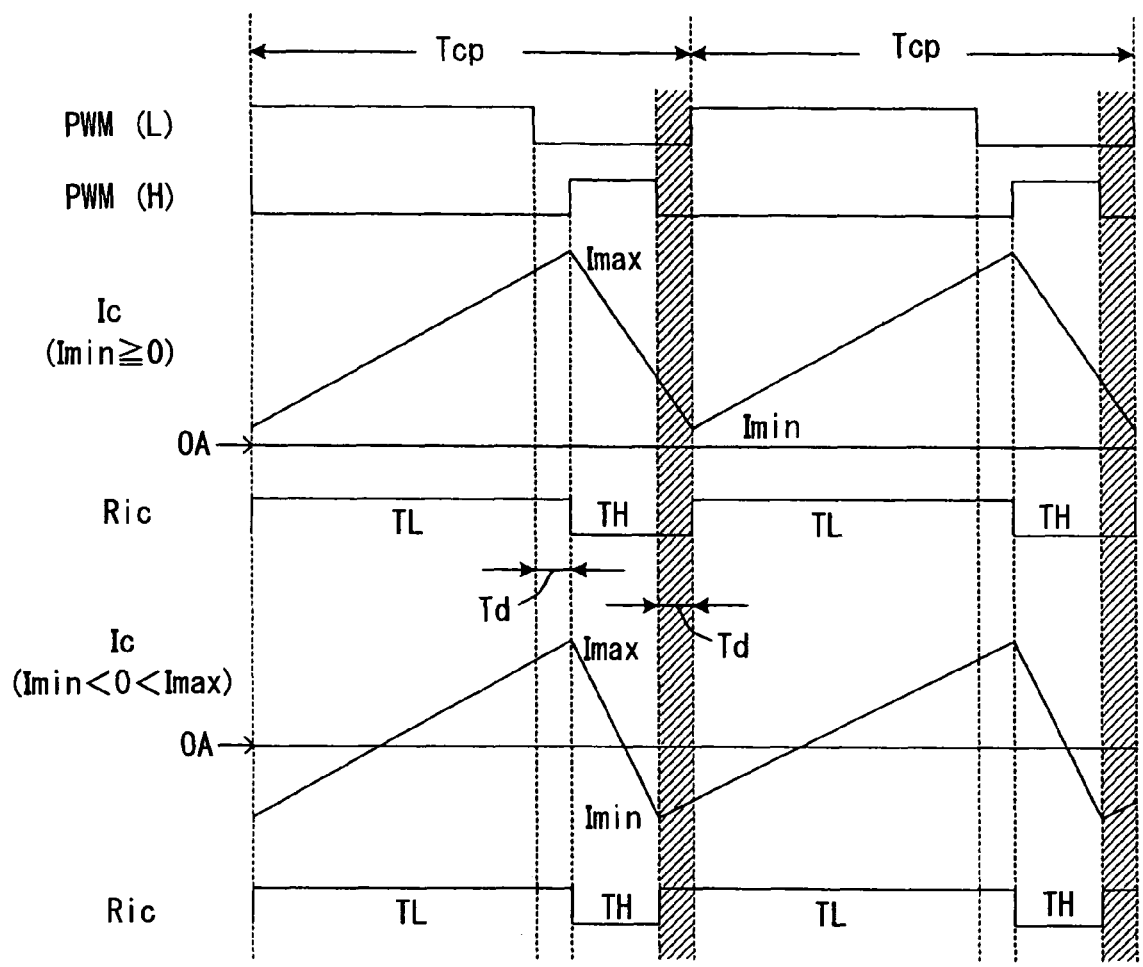
FIG. 22 is an operation diagram showing a problem caused by a direction of the coil current during a dead time period.
Figure 23:
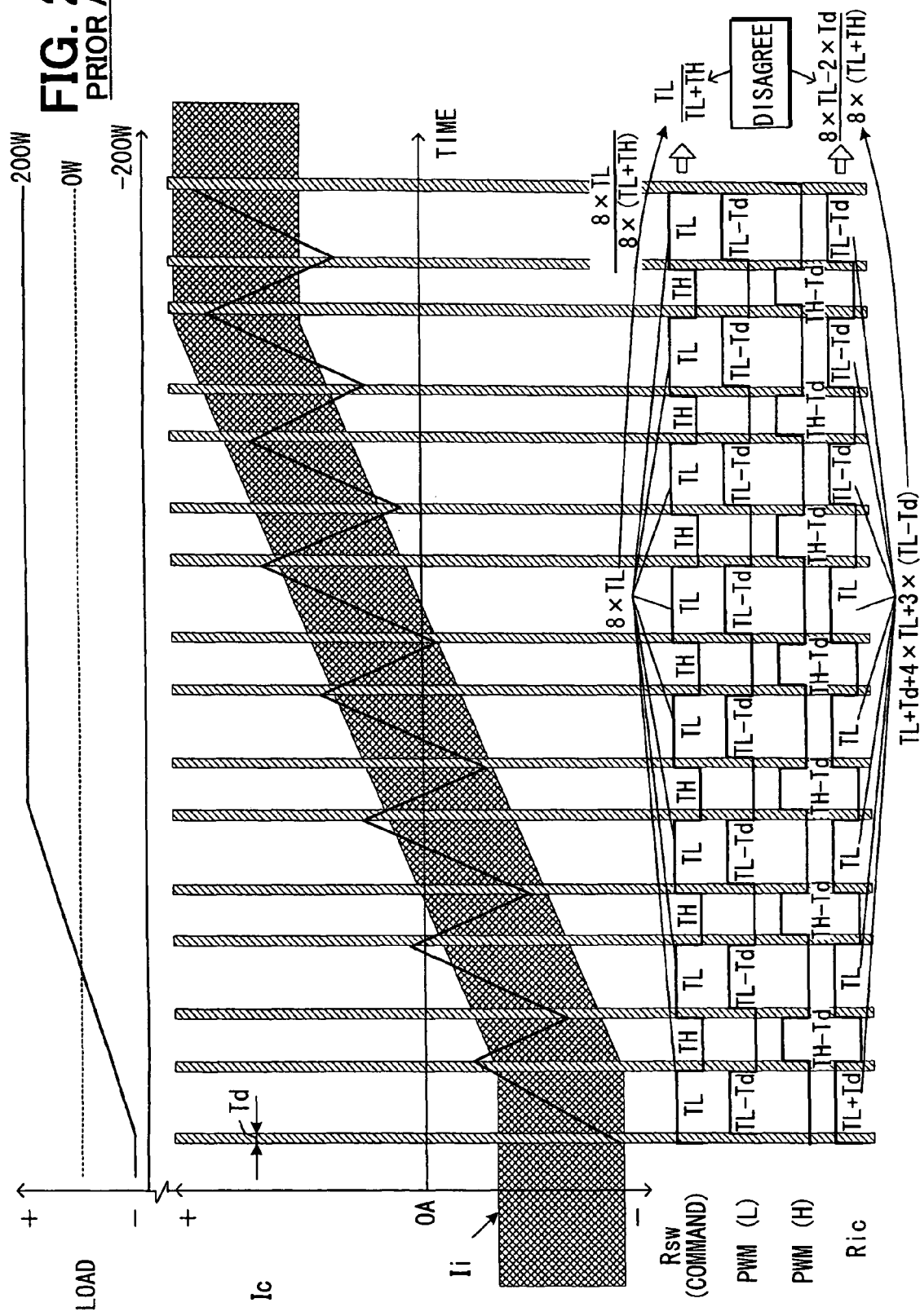
FIG. 23 is an operation diagram showing the operation of the conventional device.
Figure 24:
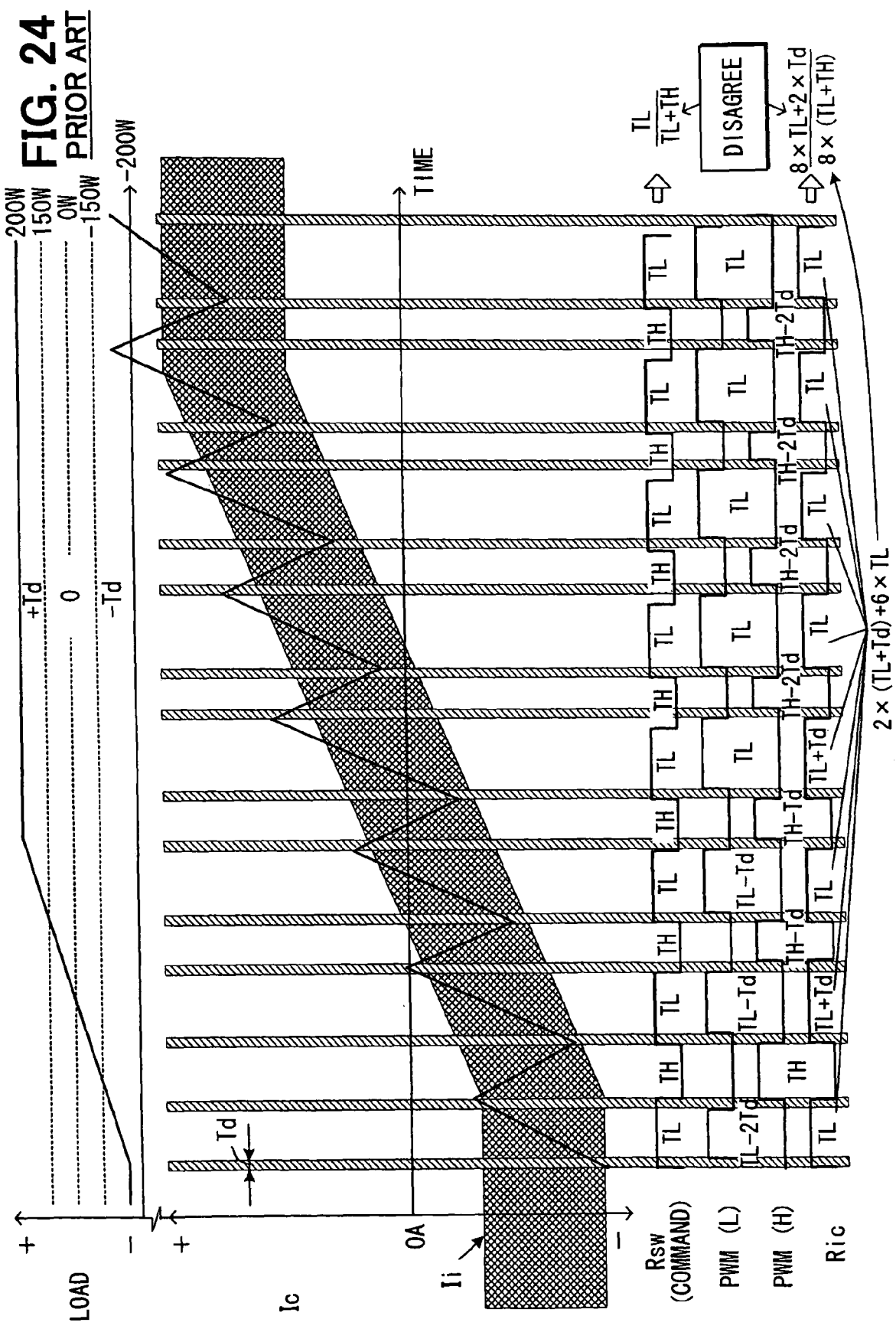
FIG. 24 is an operation diagram showing the operation of a conventional proposed improvement.

In the power conversion devices according to the first embodiment and the third to fifth embodiments, the correction value calculation units 31 and 33 to 35 include the delay unit 44 that delays the PWM signal, and the delay time is stored in the delay time memory unit 42 in advance. Alternatively, for example, as shown in FIG. 20, a delay time measurement unit 68 is disposed as delay time measuring means within the correction value calculation unit 36. The delay time measurement unit 68 measures the delay time immediately after the device starts, and the measurement results are stored in the delay time memory unit 42.

With the above configuration, since the latest delay time is always stored in the delay time memory unit 42, the direction of the coil current within the dead time period (operation mode) can be precisely determined even if the delay time changes with the use of the power conversion device for a long time.

In the above respective embodiments, the operation mode is determined according to the direction of the coil current within the dead time period to set the ratio correction value and the offset value, or the cycle correction value. Alternatively, for example, the object of the present invention can be achieved by simply changing the ratio correction value according to the operation mode.

In the above embodiments, there is provided one power converter circuit 10. However, the present invention can be applied to a multiphase power conversion device that controls plural power converter circuits. In this case, when the direction of the coil current is detected by one power converter circuit, and the PWM signal of all the power converter circuits are corrected based on the detection results, the device structure can be simplified, and the costs can be suppressed.

In the above embodiments, the present invention is applied to the step-up type DC/DC converter. However, the present invention is capable of providing the same advantages as those of the above embodiments even if the present invention is applied to a step-down or step-up/down type DC/DC converter. The present invention is capable of providing the same advantages as those in the above embodiments even if the present invention is applied to an insulation type converter or a non-insulation type converter.

Further, in the above embodiments, the respective units of the control system such as the switching ratio calculation unit 16 and the PWM signal generation unit 20 are constituted by digital circuits. Alternatively, the present invention is applicable even if those respective units are configured as analog circuits.

What is claimed is:

1. A power conversion device, comprising:
a power converter circuit having a coil, and a high side switch and a low side switch which change over a path of a current that flows in the coil;
switching ratio setting means for setting a switching ratio of the power converter circuit so that an output from the power converter circuit is controlled to a target value; and
PWM signal generating means for generating PWM signals that allow the high side switch and the low side switch to alternately turn on and off, respectively, based on the switching ratio that is set by the switching ratio setting means, the PWM signals being provided with a dead time for turning off both of the high side switch and the low side switch when the respective switches are changed over;

coil current detecting means for detecting a coil current that flows in the coil of the power converter circuit;

current direction determining means for determining a direction of the coil current during a dead time period where the high side switch and the low side switch are off based on a detection signal from the coil current detecting means; and PWM signal correcting means for correcting the PWM signals of the respective switches which are generated by the PWM signal generating means according to a determination result of the current direction determining means to change the coil current according to the switching ratio.

2. The power conversion device according to claim 1, wherein:

the PWM signal correcting means sets a ratio correction value used to generate the respective PWM signals from the switching ratio by the PWM signal generating means according to the determination result of the current direction determining means to correct the ratio of the respective PWM signals.

3. The power conversion device according to claim 2, wherein:

the PWM signal correcting means corrects offset quantity of the PWM signals with respect to a control cycle period which is used to generate the respective PWM signals by the PWM signal generating means according to the determination result of the current direction determining means in addition to the ratio of the respective PWM signals.

4. The power conversion device according to claim 3, wherein:

the PWM signal correcting means corrects the respective PWM signals in a next control cycle period with the ratio correction value of two control cycle periods including a previous control cycle period and a present control cycle period when the determination result made by the current direction determining means changes, and corrects the ratio of the respective PWM signals in a subsequent control cycle period with the ratio correction value of one control cycle period corresponding to the determination result until the determination result made by the current direction determining means changes.

5. The power conversion device according to claim 3, wherein:

the PWM signal correcting means corrects the control cycle period when the PWM signal generating means generates the respective PWM signals according to the determination result made by the current direction determining means in addition to the ratio of the respective PWM signals and the offset quantity.

6. The power conversion device according to claim 5, wherein:

the PWM signal correcting means corrects a present control cycle period according to the determination result, and corrects the ratio of the PWM signals according to the correction of the control cycle period when the determination result made by the current direction determining means changes, corrects the respective PWM signals with the ratio correction value of two control cycle periods including the previous control cycle period and the present control cycle period in the next control cycle period, and corrects the ratio of the respective PWM signals with the ratio correction value corresponding to the determination result until the determination result made by the current direction determining means changes in the subsequent control cycle period.

7. The power conversion device according to claim 3, further comprising:

current zero period detecting means for detecting a current zero period where no current flows in the coil during the dead time period based on the detection signal from the coil current detecting means, wherein the PWM signal correcting means acquires the ratio correction value corresponding to the amount of current that does not flow within the current zero period based on the current zero period and the determination result made by the current direction determining means to adjust the ratio of the PWM signals by the ratio correction value when the current zero period is detected by the current zero period detecting means.

8. The power conversion device according to claim 1, wherein:

the coil current detecting means detects a potential at a measurement point, which is a connection point of the high side switch and the low side switch in the power converter circuit; and the current direction determining means includes delay means for delaying at least one of the PWM signals that are generated by the PWM signal generating means by a delay time required to change the detection signal from the coil current detecting means with a change in the PWM signals, and the current direction determining means takes in the PWM signals through the delay means, and determines the direction of the coil current during the dead time period based on the PWM signals and the detection signal from the coil current detecting means.

9. The power conversion device according to claim 8, further comprising:

delay time storing means for storing the delay time of the PWM signals in the delay means, wherein the delay mean delays the PWM signals according to the delay time that is stored in the delay time storing means.

10. The power conversion device according to claim 9, further comprising:

delay time measuring means for measuring the delay time required to change the detection signal from the coil current detecting means with a change in the PWM signals to store the measurement result in the delay time storing means in an initial operation after the power conversion device starts.

11. The power conversion device according to claim 1, wherein:

the coil current detecting means detects the potential at a measurement point, which is a connection point of the high side switch and the low side switch in the power converter circuit; and the current direction determining means determines the direction of the coil current during the dead time period based on the ratio of a low level/high level of the detection signal from the coil current detecting means and a ratio of at least one of the PWM signals that are generated by the PWM signal generating means.

12. The power conversion device according to claim 8, wherein:

the coil current detecting means includes a voltage divider circuit that divides the potential at the measurement point and inputs a divided potential to the current direction determining means.

13. The power conversion device according to claim 8, wherein:

the coil current detecting means includes a photo coupler including a light emission element that is energized through a current limit resistor from the measurement point, and a light sensitive element that receives a light from the light emission element to input a light reception signal to the current direction determining means.

14. The power conversion device according to claim 8, wherein:

the coil current detecting means includes a voltage divider circuit that divides the potential of the measurement point, and a comparator that compares a divided voltage from the voltage divider circuit with a determination voltage for the current direction determination; and the coil current detecting means inputs a signal from the comparator to the current direction determining means.

15. The power conversion device according to claim 8, wherein:

the coil current detecting means includes a voltage divider circuit that divides the potential of the measurement point, and an A/D converter circuit that converts a divided voltage from the voltage divider circuit into a digital value; and the coil current detecting means inputs the digital value from the A/D converter circuit to the current direction determining means.

16. The power conversion device according to claim 8, wherein:

the coil current detecting means includes a plurality of voltage divider circuits that divide the potential of the measurement point, which are different in a divided voltage value; and the coil current detecting means inputs voltages that are divided by the plurality of voltage divider circuits to the current direction determining means.

17. The power conversion device according to claim 16, wherein:

the coil current detecting means includes a first voltage divider circuit that divides the potential at the measurement point to determine the input voltage to the power converter circuit by the current direction determining means, and a second voltage divider circuit that divides the potential at the measurement point to determine the output voltage from the power conversion circuit by the current direction determining means.

18. The power conversion device according to claim 1, wherein:

the coil current detecting means includes a current sensor that detects a current value of the coil current, and the current direction determining means estimates the current value during a next dead time period based on the current value of the coil current which is detected by the current sensor to determine the direction of the coil current during the dead time period.

19. The power conversion device according to claim 18, wherein:

the current direction determining means takes in the current value from the coil current detecting means at a time point when the PWM signal that is generated by the PWM signal generating means changes over to estimate the current value during the next dead time period according to the current value.

20. The power conversion device according to claim 1, wherein:

the switching ratio setting means, the PWM signal generating means, the current direction determining means, and the PWM signal correcting means are configured as a digital circuit that operates in synchronism with clock signals.

21. The power conversion device according to claim 1, further comprising:

surge absorption protecting means disposed between the coil current detecting means and the current direction determining means.

22. The power conversion device according to claim 1, further comprising:

noise filter means disposed between the coil current detecting means and the current direction determining means.

* * * * *